(12) United States Patent
Takahashi et al.

(10) Patent No.: US 6,337,926 B2
(45) Date of Patent: *Jan. 8, 2002

(54) IMAGE RECOGNITION METHOD, IMAGE RECOGNITION APPARATUS, AND RECORDING MEDIUM

(75) Inventors: Kenichi Takahashi; Yoshinori Awata; Manabu Akamatsu, all of Ebina (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/177,792

(22) Filed: Oct. 23, 1998

(30) Foreign Application Priority Data

Nov. 6, 1997 (JP) ............................... 9-304695

(51) Int. Cl.[7] ................................. G06K 9/62
(52) U.S. Cl. ....................... 382/216; 382/220
(58) Field of Search ................ 382/216, 217, 382/218, 220, 221, 224, 229, 232, 222, 209

(56) References Cited

U.S. PATENT DOCUMENTS

| | | | | |
|---|---|---|---|---|
| 4,225,850 A | * | 9/1980 | Chang et al. | 382/124 |
| 4,338,626 A | * | 7/1982 | Lemelson | 358/93 |
| 5,014,330 A | | 5/1991 | Kobayashi et al. | |
| 5,261,010 A | * | 11/1993 | Lo et al. | 382/216 |
| 5,465,308 A | * | 11/1995 | Hutcheson et al. | 382/159 |
| 5,481,621 A | | 1/1996 | Kuratomi et al. | |

FOREIGN PATENT DOCUMENTS

| | | |
|---|---|---|
| EP | 0 331 354 A2 | 9/1989 |
| EP | 0 539 653 A2 | 5/1993 |
| JP | 5-12446 | 1/1993 |
| JP | 6-309461 | 11/1994 |
| JP | 8-63604 | 3/1996 |
| KR | 1993-0002347 | 3/1993 |

* cited by examiner

Primary Examiner—Andrew W. Johns
Assistant Examiner—Seyed Azarian
(74) Attorney, Agent, or Firm—Oliff & Berridge PLC

(57) ABSTRACT

In an image recognition method of recognizing a plurality of images from an input image, the plurality of images to be recognized including at least one of a specific image and images provided by rotating the specific image, the method includes the steps of: preparing at least one of mask areas on a window area for each image to be recognized, the window area being structured by cells which are arrayed in two-dimensionally, the cell being formed of at least one pixel, the mask area being structured by at least one of the cells and corresponding to an area representing a feature of the image to be recognized; first determining whether or not the image to be recognized exists based on the result of subjecting pixel density values of the input image in the mask area to operation for each image to be recognized; and second determining whether or not any of the plurality of images to be recognized exists in the window area based on the determination result of the first determining step.

26 Claims, 23 Drawing Sheets

1: SPECIFIC IMAGE

1: SPECIFIC IMAGE

2: CENTER POSITION

3: SPECIFIC IMAGE

4: SPECIFIC IMAGE

5: SPECIFIC IMAGE

FIG. 5A    FIG. 5B    FIG. 5C    FIG. 5D
<u>1</u>    <u>3</u>    <u>4</u>    <u>5</u>
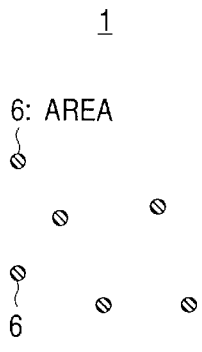
6: AREA
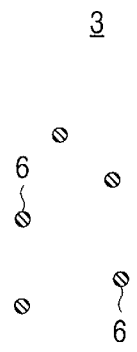
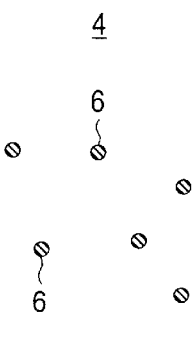
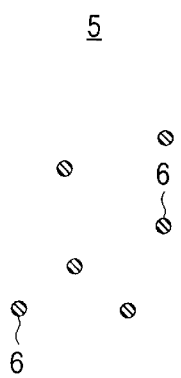
FIG. 6
<u>7</u>: WINDOW AREA
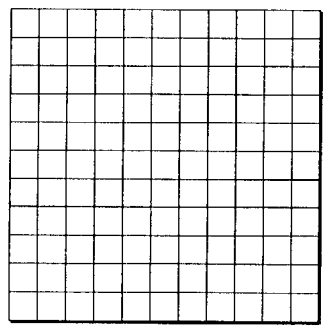

18: FLIP-FLOP GROUP

19: WINDOW AREA

| Da1 | Da2 | Da3 | Da4 | Da5 | Da6 | Da7 | Da8 | Da9 | Da10 | Da11 |
|-----|-----|-----|-----|-----|-----|-----|-----|-----|------|------|
| Db1 | Db2 | Db3 | Db4 | Db5 | Db6 | Db7 | Db8 | Db9 | Db10 | Db11 |
| Dc1 | Dc2 | Dc3 | Dc4 | Dc5 | Dc6 | Dc7 | Dc8 | Dc9 | Dc10 | Dc11 |
| Dd1 | Dd2 | Dd3 | Dd4 | Dd5 | Dd6 | Dd7 | Dd8 | Dd9 | Dd10 | Dd11 |
| De1 | De2 | De3 | De4 | De5 | De6 | De7 | De8 | De9 | De10 | De11 |
| Df1 | Df2 | Df3 | Df4 | Df5 | Df6 | Df7 | Df8 | Df9 | Df10 | Df11 |
| Dg1 | Dg2 | Dg3 | Dg4 | Dg5 | Dg6 | Dg7 | Dg8 | Dg9 | Dg10 | Dg11 |
| Dh1 | Dh2 | Dh3 | Dh4 | Dh5 | Dh6 | Dh7 | Dh8 | Dh9 | Dh10 | Dh11 |
| Di1 | Di2 | Di3 | Di4 | Di5 | Di6 | Di7 | Di8 | Di9 | Di10 | Di11 |
| Di1 | Di2 | Di3 | Di4 | Di5 | Di6 | Di7 | Di8 | Di9 | Di10 | Di11 |
| Dj1 | Dj2 | Dj3 | Dj4 | Dj5 | Dj6 | Dj7 | Dj8 | Dj9 | Dj10 | Dj11 |

MASK AREA OF FIRST
MASK AREA SETTING PART

MASK AREA OF SECOND
MASK AREA SETTING PART

MASK AREA OF THIRD
MASK AREA SETTING PART

MASK AREA OF FOURTH
MASK AREA SETTING PART

FIG. 26

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 1 | 0 |
| 0 | 0 | 0 | 0 | 0 | 0 | 0 | 0 | 0 | 0 | 0 |
| 0 | 0 | 0 | 0 | 1 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 1 | 0 |
| 0 | 0 | 0 | 0 | 0 | 0 | 0 | 0 | 0 | 0 | 0 |
| 0 | 0 | 0 | 0 | 0 | 1 | 0 | 0 | 0 | 0 | 0 |
| 0 | 0 | 0 | 0 | 0 | 0 | 0 | 0 | 0 | 0 | 0 |
| 0 | 0 | 1 | 0 | 0 | 0 | 0 | 0 | 0 | 0 | 0 |
| 0 | 0 | 0 | 0 | 0 | 0 | 0 | 0 | 1 | 0 | 0 |

19 (label for grid)

| | | | | | | | | | | |
|---|---|---|---|---|---|---|---|---|---|---|
| 0 | 0 | 0 | 0 | 0 | 0 | 0 | 0 | 1 | 0 | 0 |
| 0 | 0 | 0 | 0 | 0 | 0 | 0 | 0 | 0 | 0 | 0 |
| 0 | 0 | 0 | 1 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 1 | 0 | 0 |
| 0 | 0 | 0 | 0 | 0 | 0 | 0 | 0 | 0 | 0 | 0 |
| 0 | 0 | 0 | 0 | 1 | 0 | 0 | 0 | 0 | 0 | 0 |
| 0 | 0 | 0 | 0 | 0 | 0 | 0 | 0 | 0 | 0 | 0 |
| 0 | 1 | 0 | 0 | 0 | 0 | 0 | 0 | 0 | 0 | 0 |
| 0 | 0 | 0 | 0 | 0 | 0 | 0 | 1 | 0 | 0 | 0 |
| 0 | 0 | 0 | 0 | 0 | 0 | 0 | 0 | 0 | 0 | 0 |

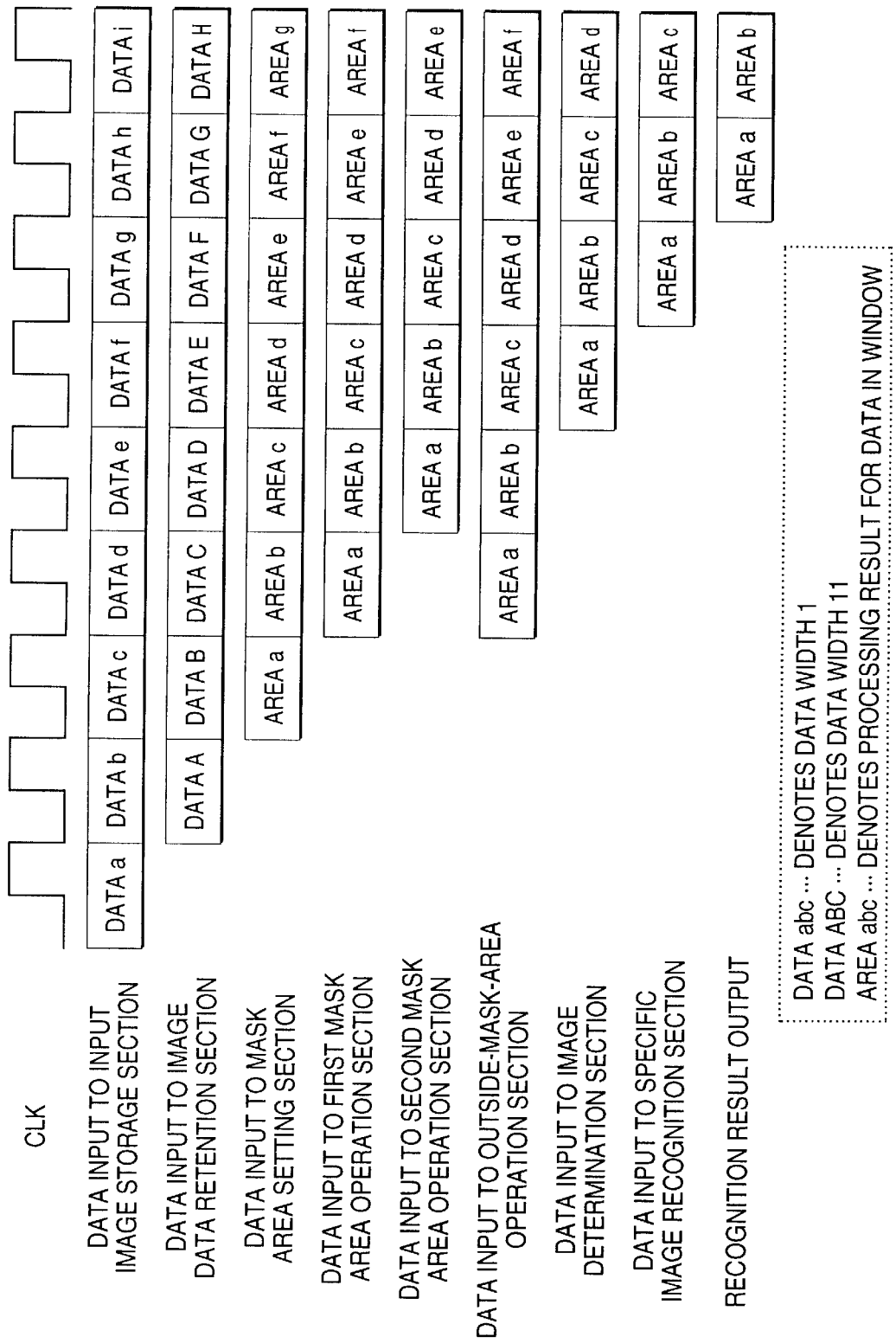

IMAGE RECOGNITION METHOD, IMAGE RECOGNITION APPARATUS, AND RECORDING MEDIUM

BACKGROUND OF THE INVENTION

1. Field of the Invention

This invention relates to an image recognition method and an image recognition apparatus for recognizing a plurality of images to be recognized, including a specific image and images provided by rotating the specific image from an input image, and a recording medium recording a program for accomplishing image recognition by the image recognition method.

2. Description of the Related Art

A template matching method is widely known as a method of recognizing a specific image from an input image. A general template matching method is as follows:

A specific image to be recognized is provided as a reference image, an input image is superposed on the reference image and a comparison is made between the images while both the images are slid relatively one pixel at a time horizontally or vertically. If all the pixels or a given number of pixels or more match, it is determined that the specific image is contained in the input image.

In this method, however, for example, if the specific image is rotated, the image matching the reference image cannot be recognized from the input image containing the specific image rotated. That is, the method has the disadvantage in that if the specific image in the input image differs from the reference image in orientation, the specific image cannot be recognized.

Proposed as a conventional method for overcoming the disadvantage is an image recognition method capable of recognizing a specific image at various rotation angles by storing the coordinates of a reference pattern (corresponding to a reference image) in memory, generating the coordinates applied when the reference pattern is rotated based on the coordinates stored in the memory, and using the generated coordinates and the coordinates stored in the memory for comparison, as disclosed in Japanese Patent Laid-Open No. Hei 5-12446.

As another method for overcoming the disadvantage, Japanese Patent Laid-Open No. Hei 8-63604 describes an image processing method of detecting the center of gravity of an image, representing the contours of the image by polar coordinate data with the center of gravity as the center, and comparing the function represented by the polar coordinate data with the function responsive to the contours of a reference image, thereby determining similarity between the images in shape. This method also copes with a rotated specific image by grasping a function phase shift as rotation of the specific image.

Further, Japanese Patent Laid-Open No. Hei 6-309461 describes an image recognition method of recognizing a specific image by applying Fourier transform to a light and dark pixel data string provided by scanning an image on the circumference of a circular window to find a spectrum pattern and comparing the spectrum pattern with a spectrum pattern of a reference image. This method also copes with a rotated specific image because the provided spectrum pattern does not depend on the scanning start position (rotation angle of the specific image) and becomes identical.

However, as seen from the description made so far, the above-described methods disclosed in the gazettes must perform complicated operations at the image recognition time and cannot be applied to uses requiring high-speed processing. If an attempt is made to realize each of the above-described methods in circuitry, namely, hardware to speed up processing, the circuit configuration becomes large-scaled and complicated.

Particularly, in recent years, a system of embedding a specific image in an image as code information representing copyright information, distribution path information, etc., of the image or a specific image as code information specifying processing to be performed for the image for using the code information to handle the image has been proposed; they look forward to realizing an inexpensive image recognition apparatus that can recognize a specific image at high speed.

SUMMARY OF THE INVENTION

It is therefore an object of the invention to provide an image recognition method and an image recognition apparatus capable of recognizing a specific image at high speed in a simple configuration with recognition accuracy independent of the orientation (rotation angle) of the specific image, and a recording medium recording a program for accomplishing the image recognition according to the image recognition method.

To the end, according to a first aspect of the invention, there is provided an image recognition method of recognizing a plurality of images from an input image, the plurality of images to be recognized including at least one of a specific image and images provided by rotating the specific image, the method including the steps of: preparing at least one of mask areas on a window area for each image to be recognized, the window area being structured by cells which are arrayed in two-dimensionally, the cell being formed of at least one pixel, the mask area being structured by at least one of the cells and corresponding to an area representing a feature of the image to be recognized; first determining whether or not the image to be recognized exists based on the result of subjecting pixel density values of the input image in the mask area to operation for each image to be recognized; and second determining whether or not any of the plurality of images to be recognized exists in the window area based on the determination result of the first determining step.

Further, whether or not the image to be recognized exists may be determined considering not only the operation result performed on the pixel density values in the mask areas, but also the operation result performed on the pixel density values in the window area outside the mask areas, in which case the recognition accuracy can be improved. Alternatively, whether or not there is a possibility that any of the images to be recognized exists in the window area rather than whether or not any of the images to be recognized exists in the window area may be determined.

Further, the images to be recognized may be images provided by rotating the specific image at arbitrary angles with the same center position as the center, in which case the image to be recognized can be defined only from the corresponding rotation angle. Further, the mask areas may be placed with the same center position matched with the center position of the window area, in which case setting of the mask areas is facilitated and the size of the window area can be minimized.

In addition, considering that as a pixel is distant from the center position of rotation, the move distance of the pixel becomes large when the pixel is rotated, the window area may be formed so that as each mask area is distant from the center position of the window area, the number of the cells making up the mask area increases, whereby the recognition miss occurrence probability can be decreased.

Further, the mask areas for the images to be recognized may be calculated and set based on the mask areas set for any one of the images to be recognized and the rotation angles of the images to be recognized. That is, the mask areas can be set easily. The mask areas corresponding to a plurality of specific images to be recognized and the images to be recognized, provided by rotating the specific images may be set on a single window area. The input image may be a binary image, in which case operation processing can be more simplified and the system scale can be more reduced.

According to a second aspect of the invention, there is provided an image recognition apparatus of recognizing a plurality of images from an input image, the plurality of images to be recognized including at least one of a specific image and images provided by rotating the specific image, the apparatus including: an image data storage unit for storing image data representing the input image; a mask area storage unit for storing setup information so as to set at least one of mask areas on a predetermined window area for each of the images to be recognized; a mask area operation unit for operating values of the image data in the mask areas for each image to be recognized; an image determination unit for determining whether or not the image to be recognized exists based on the operation result of the mask area operation unit for each image to be recognized; and a specific image recognition unit for determining whether or not any of the images to be recognized exists in the window area based on the determination result of the image determination unit for each image to be recognized. In this case, the mask area storage unit itself or a storage section is exchanged, whereby any images to be recognized can be handled.

The image recognition apparatus may further include an outside-mask-area operation unit for performing operation on values of the image data in the window area outside the mask areas for each image to be recognized, wherein the image determination unit may determine whether or not the image to be recognized exists based on the operation result of the mask area operation unit and the operation result of the outside-mask-area operation unit for each image to be recognized. Alternatively, the image determination unit may determine whether or not there is a possibility that the image to be recognized exists based on the operation result of the mask area operation unit for each image to be recognized, and the specific image recognition unit may determine whether or not there is a possibility that any of the images to be recognized exists in the window area based on the determination result of the image determination unit for each image to be recognized.

Further, if the storage contents of the mask area storage unit can be read and write arbitrarily, the mask area setup information can be changed easily.

By the way, to reliably recognize each image to be recognized, it is necessary to extract areas and set mask areas considering that the darkness values of the pixels making up the image to be recognized vary due to various factors. However, if the variations are considered to set wide mask areas for all areas, the possibility that an image similar to the image to be recognized will be erroneously recognized as the image to be recognized particularly in the portion near to the center position becomes high. Then, the mask area nearest to the center position of the window area is formed of only one cell and other mask areas are set with the mask area as the reference, whereby the erroneous recognition occurrence probability can be decreased.

The window area may be rectangular or circular and the mask areas may be set arbitrarily. If the window area is rectangular, input images which generally become often rectangular can be scanned without omission and scanning processing can be simplified. If the window area is circular, the pixel positions on the window area can be represented in polar coordinates, thus the capacity required for storing the mask areas can be decreased. Further, the mask areas can be set arbitrarily, whereby the mask areas can be set in response to the characteristics of an input image and the recognition accuracy can be improved. Of course, all types of images can also be set to the images to be recognized.

The setup information stored in the mask area storage unit may contain the setup information of the mask areas set for any one of the images to be recognized and the rotation angles of the images to be recognized. In this case, the capacity required for storing the mask area setup information can be decreased. Of course, the image data may be binary data for avoiding complexity of the circuit configuration and the apparatus or processing for each image to be recognized may be performed in parallel in the same cycle for realizing real-time processing.

According to a third aspect of the invention, there is provided a recording medium recording a program for recognizing a plurality of images from an input image, the plurality of images to be recognized including at least one of a specific image and images provided by rotating the specific image, the program including the steps of: preparing at least one of mask areas on a window area for each image to be recognized, the window area being structured by cells which are arrayed in two-dimensionally, the cell being formed of at least one pixel, the mask area being structured by at least one of the cells and corresponding to an area representing a feature of the image to be recognized; first determining whether or not the image to be recognized exists based on the result of subjecting pixel density values of the input image in the mask area to operation for each image to be recognized; and second determining whether or not any of the plurality of images to be recognized exists in the window area based on the determination result of the first determining step.

BRIEF DESCRIPTION OF THE DRAWINGS

In the accompanying drawings:

FIGS. 5A–5D are illustrations to show examples of feature areas of the images to be recognized shown in FIG. 2 and FIG. 4A–4C;

FIG. 6 is an illustration to show an example of a window area in the embodiment of the invention;

FIG. 26 is an illustration to show a data example on a window area of the image data retention section of the image processing apparatus in the embodiment of the invention;

FIGS. 27A–27D are illustrations to show output data examples of the mask area setting section of the image processing apparatus in the embodiment of the invention, FIG. 27A shows a mask area output data of the first mask area setting section, FIG. 27B shows the mask area output data of the second mask area setting section, FIG. 27C shows the mask area output data of the third mask area setting section and FIG. 27D shows the mask area output data of the fourth mask area setting section;

FIG. 28 is an illustration to show a data example on a window area of the image data retention section of the image processing apparatus in the embodiment of the invention;

FIGS. 29A–29D are illustrations to show output data examples of the mask area setting section of the image processing apparatus in the embodiment of the invention FIG. 29A shows a mask area output data of the first mask area setting section, FIG. 29B shows the mask area output data of the second mask area setting section, FIG. 29C shows the mask area output data of the third mask area setting section and FIG. 29D shows the mask area output data of the fourth mask area setting section;

FIG. 30 is an illustration to show a processing cycle example in the image processing apparatus in the embodiment of the invention.

DETAILED DESCRIPTION OF THE PREFERRED EMBODIMENTS

Referring now to the accompanying drawings, there is shown an image recognition apparatus according to one embodiment of the invention.

I. Image processing method

First, an image recognition method (hereinafter referred to as "an image processing method") provided by the image recognition apparatus according to the embodiment of the invention will be discussed.

Figure 1:
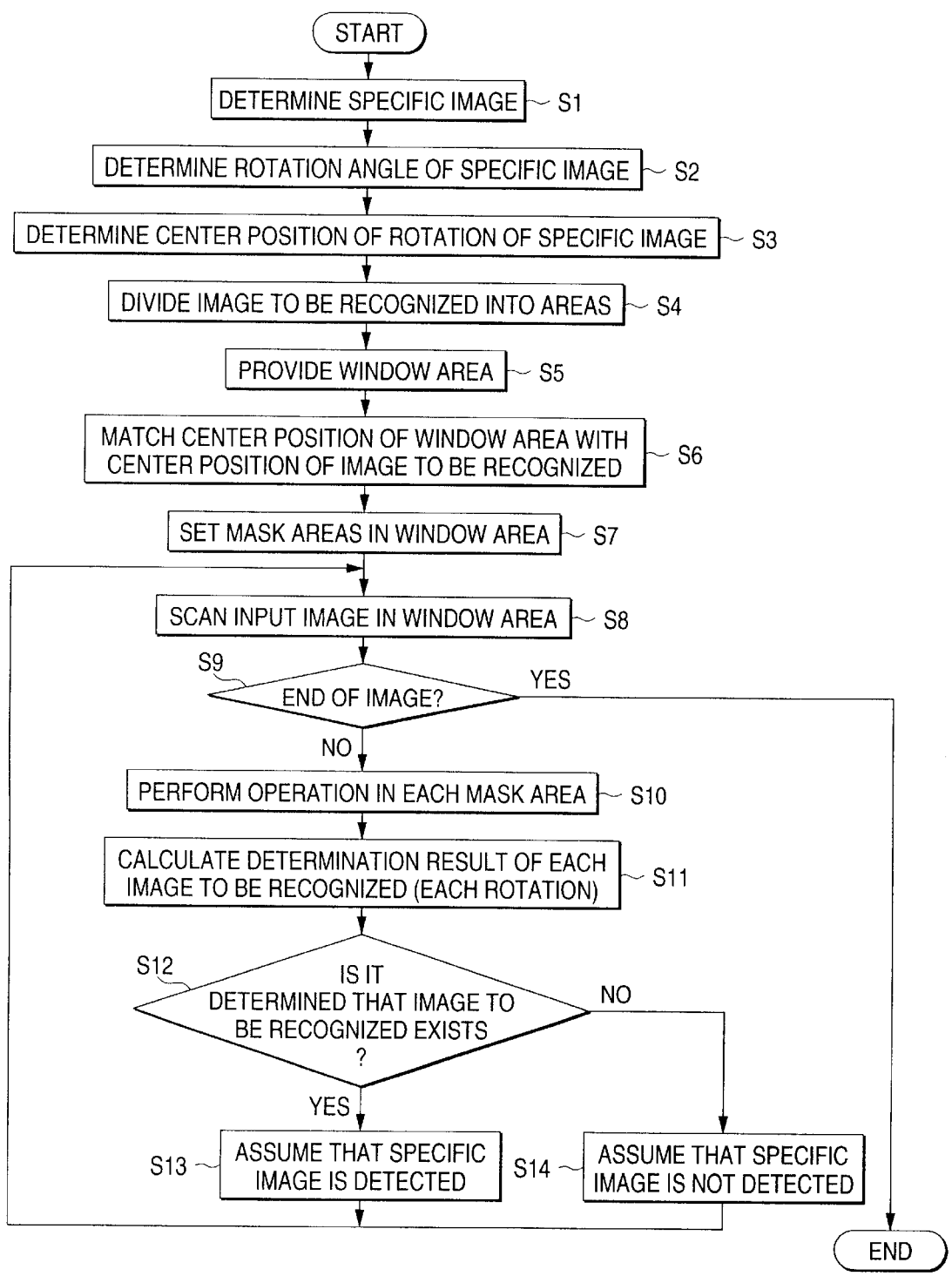
FIG. 1 is a flowchart to show a processing flow of an image processing method provided by an image processing apparatus according to one embodiment of the invention.

FIG. 1 is a flowchart to show a flow of the image processing method. As shown in the drawing, first at step S1, a specific image is determined. At this time, one or more specific images maybe determined. Next, at step S2, what angle the specific image is input at is determined in response to an image input method.

If the specific image can be input at any angle, a plurality of angles are sampled in consideration of the size and input resolution of the specific image. As a result, for example, if n images are determined at step S1 and m angles are sampled at step S2, n×m images are to be recognized.

At step S3, the center position of rotation of the specific image is determined and at step S4, the image to be recognized, provided by rotating the specific image with the center position as the center is divided into a plurality of areas. Next, at step S5, a window area is provided in consideration of the size and input resolution of the image to be recognized. At step S6, the center position of the window area is matched with the center position of rotation of the image to be recognized. At step S7, a mask area is set in the window area. The above-described processing will be discussed with a specific example.

Figure 2:
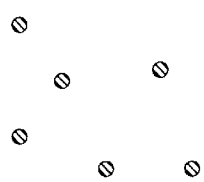
FIG. 2 is an illustration to show an example of a specific image in the embodiment of the invention.
Figure 3:
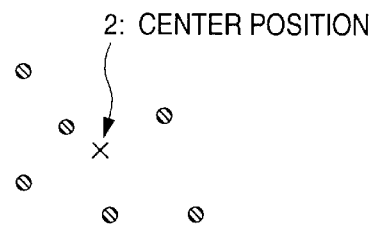
FIG. 3 is an illustration to show the relationship between the specific image (image to be recognized) in FIG. 2 and a center position thereof.
Figure 4A:
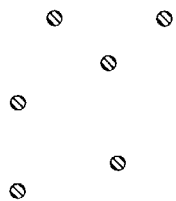
FIGS. 4A–4C are illustrations to show examples of images to be recognized, provided by rotating the specific image in FIG. 2.
Figure 4B:
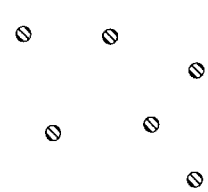
Figure 4C:
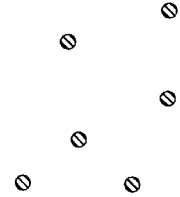
Figure 7:
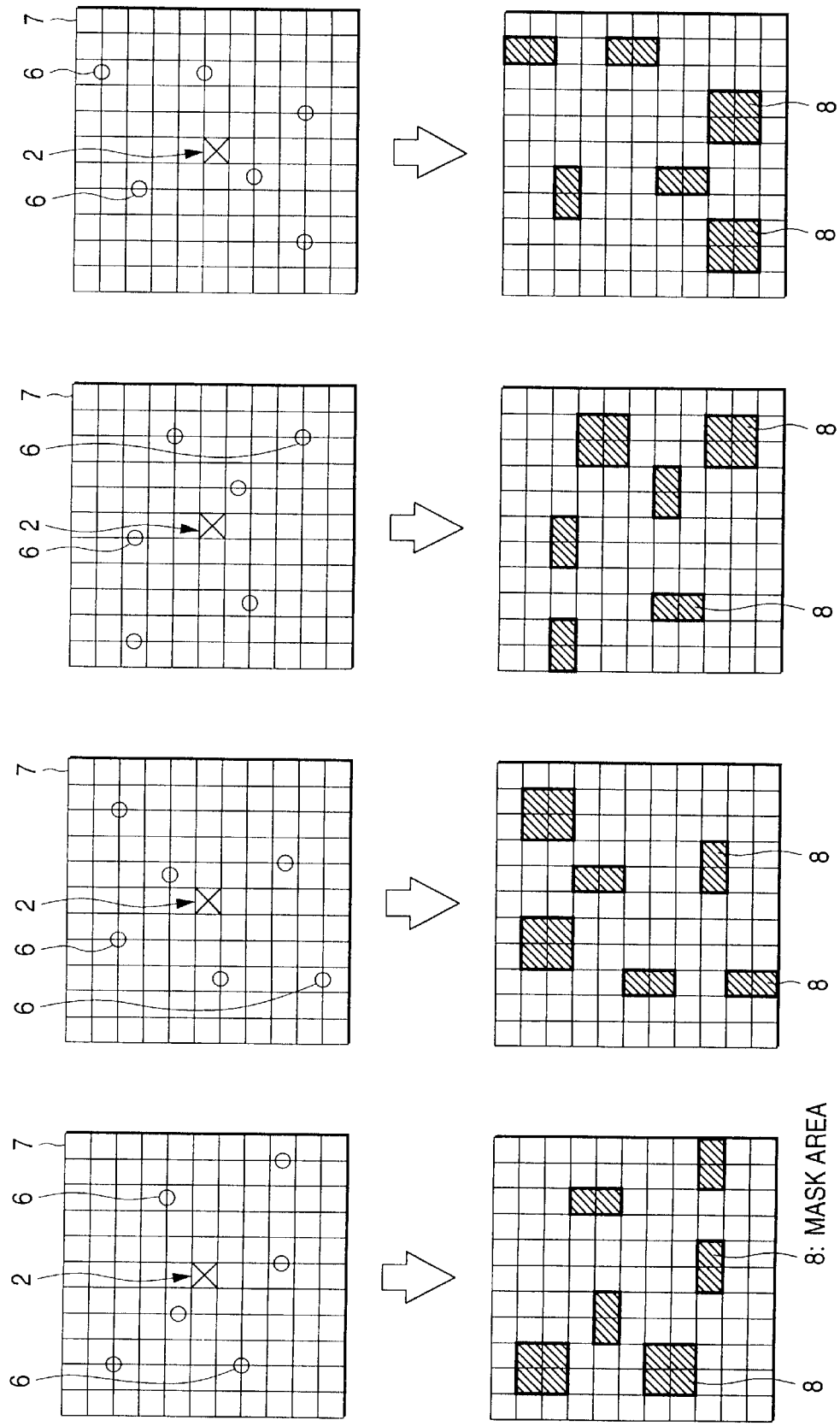
FIGS. 7A–7D are illustrations to show examples of the images to be recognized shown in FIG. 2 and FIGS. 4A–4C and mask areas on the window area.

FIG. 2 is an illustration to show a specific image 1 having predetermined code information. In the image processing method, a center position 2 which becomes the rotation center is set on the specific image 1 as shown in FIG. 3 to recognize not only the specific image 1, but also an image provided by rotating the specific image 1. If the specific image is rotated 90 degrees, 180 degrees, and 270 degrees clockwise with the center position 2 as the center, images to be recognized 3 to 5 in FIGS. 4A–4C are provided. In the image processing method, the four images (provided at rotation angles 0 degrees, 90 degrees, 180 degrees, and 270 degrees) are to be recognized. For convenience of the description, the specific image 1 will also be referred to as the image to be recognized 1.

Next, in the image processing method, areas representing the feature of the image to be recognized are set for each of the four images to be recognized. In the examples shown in FIG. 2 and FIGS. 4A–4C, the image represented in black (hereinafter referred to as "black image") represents the feature of the image to be recognized; since the black image consists of six black pixels, six circled areas are set for each of the four images to be recognized, as shown in FIGS. 5A–5D.

In the image processing method, a window area 7 like a lattice (see FIG. 6) to scan an input image and recognize the image to be recognized from the input image is provided. The window area 7 is set to a size to allow only one of the images to be recognized 1 and 3–5 to be entered. In the example shown in FIG. 6, the window area is set to a size of 11×11 cells. The size of each cell in the window area 7 (resolution) is arbitrary and set appropriately in response to the specific image.

Next, in the image processing method, mask areas 8 corresponding to the setup areas 6 are set on the window area 7 for each of the images to be recognized 1 and 3–5, as shown in FIGS. 7A–7D. At this time, the mask areas 8 are set so that the center position 2 of rotation of each of the images to be recognized 1 and 3–5 matches the center of the window area 7. The six mask areas 8 for each of the images to be recognized 1 and 3–5 are set on the same window area 7 and finally 24 mask areas are set on the single window area 7.

In the image processing method, the above-described processing is performed before an input image is scanned. Referring again to FIG. 1, the subsequent processing will be discussed.

At step S8, an input image is scanned in the window area. At step S9, whether or not the input image has been scanned completely is determined. If the input image has not been scanned completely, control goes to step S10 and predetermined operations are performed on pixel density values for each mask area. At step S11, for each specific image, predetermined operations are performed on pixel density values in other areas than the mask areas and whether or not each image to be recognized exists or can exist is determined based on the operation result and the operation result for each mask area at step S10. Further, if it is determined at step S12 that the image to be recognized exists or that the possibility that the image to be recognized may exist is high, control goes to step S13 at which it is assumed that the image to be recognized is detected; otherwise, control goes to step S14 at which it is assumed that the image to be recognized is not detected. Then, control returns to step S8 and the above-described processing is repeated until completion of scanning all the input image.

The processing will be discussed with the above-described specific example. Here, assume that the input image is an input image 9 shown in FIG. 8, which is an illustration to show an example of the input image 9. The input image 9 appears to be made up of black dots irregularly placed, but comprises the images to be recognized 1 and 3–5.

Figure 9:
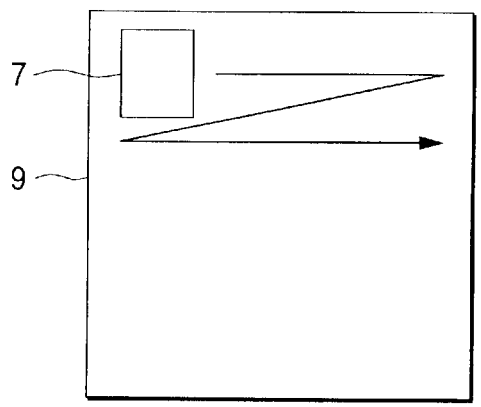
FIG. 9 is an illustration to show how the input image is scanned with the window area shifted in the embodiment of the invention.

In the image processing method, the input image 9 is scanned from the upper-left corner to the lower-right corner with the window area 7 on which the mask areas 8 are set. Each time the position of the window area 7 relative to the input image 9 changes during the scanning, operations are performed on the pixel density values on the input image 9 corresponding to each mask area 8. As specific scanning, as shown in FIG. 9, horizontal scanning repeating processing of shifting the window area 7 by one pixel horizontally from the left end of the input image 9 until the right end of the window area 7 reaches the right end of the input image 9 is repeated with the window area 7 shifted one pixel at a time vertically. Of course, the vertical scanning terminates when the lower end of the window area 7 reaches the lower end of the input image 9.

In the image processing method, as operations performed each time the position of the window area 7 relative to the input image 9 changes, for each of the images to be recognized 1 and 3–5, logical operation of OR, if one mask area 8 contains one or more black pixels, setting the mask area 8 to '1' is performed, logical operation of AND outputting '1' if the operation result on the six mask areas 8 is '1' is performed, logical operation of NOR outputting '1' if the window area except the mask areas 8 on the input image 9 is all white pixels is performed, and with respect to the AND logical operation result, logical operation AND is performed with the NOR logical operation result, then the operation result of the logical operation AND is used as the determination result. The operations are performed in parallel for each of the images to be recognized 1 and 3–5.

Figure 8:
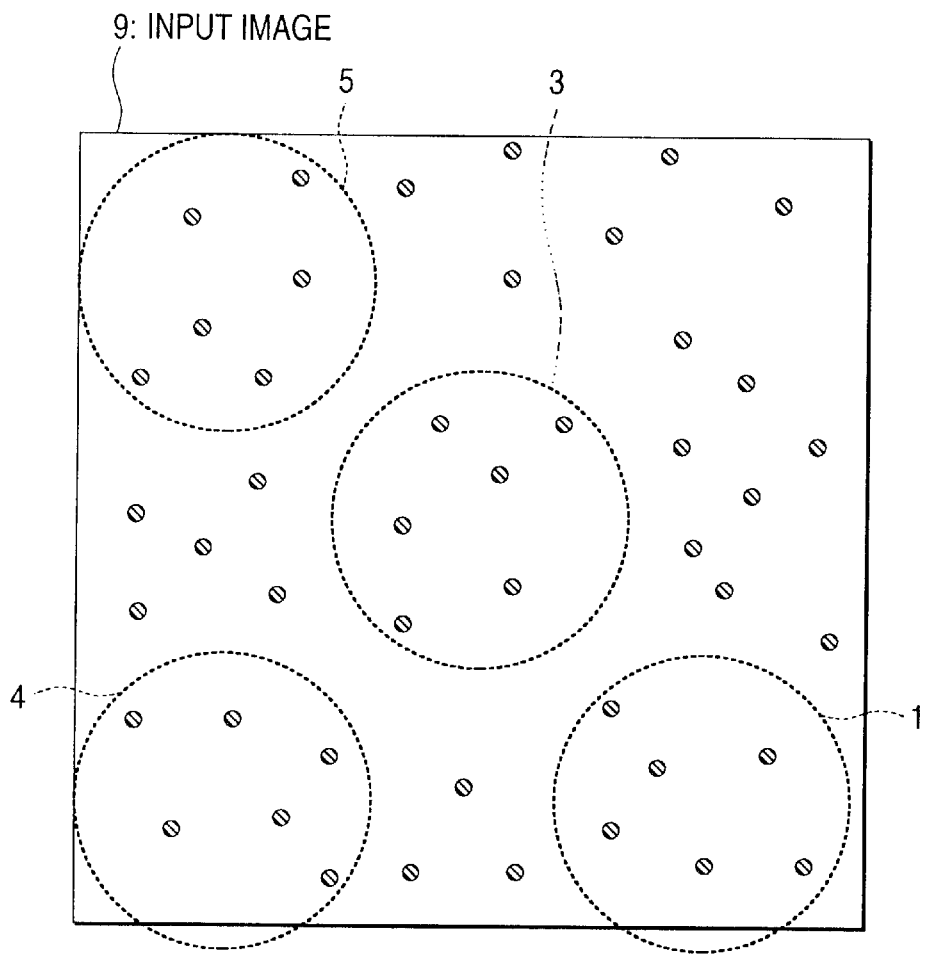
FIG. 8 is an illustration to show an example of an input image in the embodiment of the invention.

As seen from the description, in the image processing method, when the position of the window area 7 becomes a position containing a specific image on the input image 9 completely, only one of the determination results for the images to be recognized 1 and 3–5 becomes '1' and when the window area 7 is placed in any other position, all the determination results become '0.' For the input image 9 shown in FIG. 8, first, only the determination result for the image to be recognized 5 rotated 270 degrees clockwise becomes '1' and as the scanning advances, the determination results for the images to be recognized 3, 4, and 1 rotated 90 degrees, 180 degrees, and 0 degree clockwise become '1' in order. Thus, in the image processing method, the four images-to be recognized different in orientation can be recognized from the input image 9. Of course, if the input image 9 itself is rotated 90 degrees, 180 degrees, and 270 degrees clockwise, the four images to be recognized can be recognized as described above.

In the operation on each mask area 8, the following operation maybe used without performing the OR logical operation: The pixel density values on the input image 9 positioned in the mask area 8 are added and if the total density value exceeds a predetermined threshold value, '1' is output; otherwise, '0' is output. In short, optimum operations may be adopted in response to an error caused by noise mixed in a specific image, recognition accuracy, etc.

By the way, to scan a two-dimensional image and get an input image, the rotation angle of a specific image may become arbitrary (angle other than 0, 90, 180, or 270 degrees) depending on the image read technique. In such a case, in the image processing method, mask area 8 may be set for each of specific images provided in order by rotating that specific image at sufficiently small angles. That is, the number of the images to be recognized may be increased and mask area 8 may be set for each of the images to be recognized.

In the image processing method, if each mask area 8 is set widely for the corresponding division area 6, the probability that a specific image at an arbitrary rotation angle where the image to be recognized is not provided in advance can be recognized as the image to be recognized can be raised, and the effect of an error caused by noise mixed in the image to be recognized on determination can be decreased, namely, the recognition accuracy can be improved.

Further, making the most of the point of limiting the images to be recognized to a specific image and the images provided by rotating the specific image, the recognition accuracy of the image processing method can be improved. For example, it is noted that if the rotation angle is the same, as a pixel is more distant from the center position 2, the move distance is larger, and the mask area 8 corresponding to an area 6 is set widely as it becomes distant from the center position 2, whereby the recognition accuracy can be improved.

By the way, if all mask areas are set widely for the areas 6, it is feared that a pixel existing at a position exceeding the error range will also be recognized as the pixel of the image to be recognized particularly at a position near to the center position 2 where the pixel move distance accompanying rotation is small, and the possibility of erroneous recognition of recognizing an image analogous to the image to be recognized as the image to be recognized in error becomes high. Then, in the image processing method, if the mask area at a position where the pixel move distance accompanying rotation is small at the same rotation angle (namely, the position nearest to the center position 2 and the center position of the window area 7) is made of only one cell and the extents of other mask areas are determined based on the distance from the center position 2 and the center position of the window area 7 and the resolution of the window area 7, the recognition accuracy can be improved.

The images to be recognized are only a specific image and the images provided by rotating the specific image. Thus, if the window area is shaped like a circle, the size occupied by the window area can be more narrowed. Moreover, if the window area is circular, the positions of all mask areas can be managed in polar coordinates. Thus, by giving a rotation angle, the mask area coordinates of the specific image rotated at the rotation angle can be calculated using a known simple expression based on the mask area coordinates of a specific image not rotated.

In the image processing method, if mask areas can be set as desired rather than fixed, proper mask areas can be set in response to change in characteristics of an input image and a specific image or the like. Therefore, the recognition accuracy can be improved. Of course, the specific image itself to be recognized can also be changed.

Further, if either or both of the specific image used as recognition reference and the input image are color or gray-scale images, the above-described recognition processing is performed after the input image is binarized, whereby the image processing method can be applied. For example, even if an apparatus incorporating the image processing method includes a read unit that can read color information and monochrome multivalued information from an original, and the input image is a color or gray-scale image, normal recognition processing can be performed by performing proper image processing containing binarization. This is also applied if the specific image used as recognition reference is a color or gray-scale image. Therefore, if either or both of the specific image and the input image are color or gray-scale images, the specific image can be recognized by performing simple binary operations and in the specific image recognition processing, recognition processing independent of attribution information other than the shape, such as color or darkness, can be performed.

Of course, the specific image may be compared and recognized as the color or gray-scale image intact without converting the attribute information although operations become complicated. A specific example will be discussed later as a second modified embodiment.

In the image processing method, recognition of a specific image and the images provided by rotating the specific image has been described. However, if mask areas corresponding to another specific image and the images provided by rotating the specific image are set in the window area 7 and operations are also performed thereon in parallel, more than one specific image and the images provided by rotating the specific images can be recognized in one window area.

II. Image recognition apparatus

Next, the image recognition apparatus (hereinafter referred to as "image processing apparatus") according to the embodiment for accomplishing the image processing method described above will be discussed.

(1) Entire configuration

Figure 10:
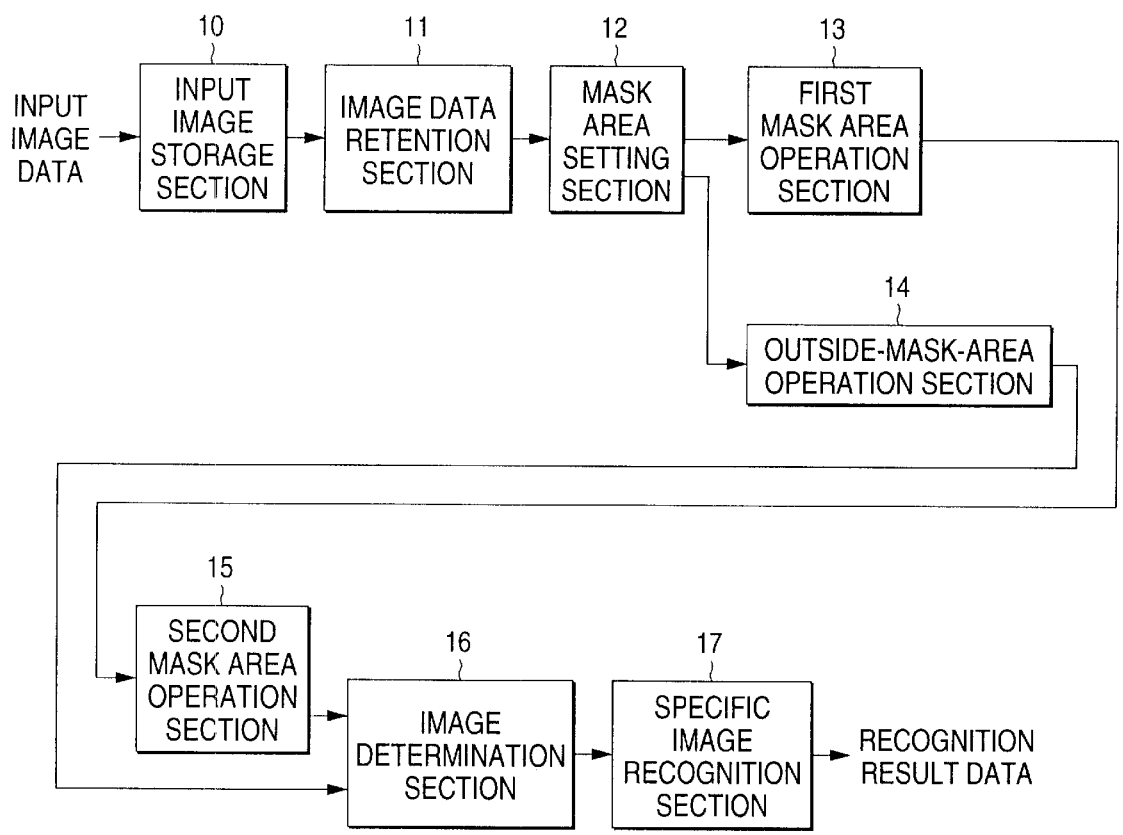
FIG. 10 is a block diagram to show a configuration example of the image processing apparatus in the embodiment of the invention.

FIG. 10 is a basic block diagram of the image processing apparatus. As shown here, the image processing apparatus inputs binary image data representing an input image, which will be hereinafter referred to as input image data, and outputs recognition result data representing the recognition result about specific images for the input image. The description set forth below assumes that the image data value is a pixel density value and that the image data value (pixel density value) for a white pixel is 0 and the image data value (pixel density value) for a black pixel is 1.

In FIG. 10, numeral 10 is an input image storage section for sequentially storing input image data of a plurality of lines required for recognizing a specific image, numeral 11 is an image data retention section for reading image data corresponding to a preset window area from the input image storage section 10 and temporarily retaining the read image data, and numeral 12 is a mask area setting section for extracting image data contained in a plurality of preset mask areas as mask area data for each mask area from the image data retained in the image data retention section 11 for each of a preset specific image and specific images provided by rotating the preset specific image and also extracting image data contained in the window area outside the mask areas as outside-mask-area data for each of the specific images.

Numeral 13 is a first mask area operation section for performing the above-described logical operation, such as OR, or an arithmetic operation on the values of the mask area data extracted in the mask area setting section 12 and outputting the operation result, numeral 14 is an outside-mask-area operation section for performing the above-described logical operation, such as NOR, on the values of the outside-mask-area data extracted in the mask area setting section 12 and outputting the operation result, and numeral 15 is a second mask area operation section for performing the above-described logical operation or an arithmetic operation on the operation results of the first mask area operation section 13 for each specific image and outputting the operation result.

Numeral 16 is an image determination section for determining whether or not each-specific image exists based on the operation results of the second mask area operation section 15 and the outside-mask-area operation section 14. Numeral 17 is a specific image recognition section for determining whether or not the specific image or any one of the specific images provided by rotating the specific image exists in the image data retained in the image data retention section 11 based on the determination result of the image determination section 16, and outputs the determination result as recognition result data.

(2) Functions and configurations of the sections

Next, the functions and configurations of the sections shown in FIG. 10 will be discussed. The description set forth below assumes that the specific image to be recognized is the image to be recognized 1 in FIG. 2, that the images provided by rotating the image are the images to be recognized 3, 4, and 5 in FIGS. 4A–4C, and that the image processing apparatus recognizes the four images to be recognized from an input image. It also assumes that the window area for recognizing the images to be recognized is set to a size of 11×11 cells, each corresponding to one dot. Further, it assumes that the resolution of an input image is set to the resolution to allow the relationships between the images to be recognized and the input image to become as shown in FIGS. 7A–7D.

In the assumptions, the input image storage section 10 needs to include memory capable of storing at least 10-line image data and is made up of 10 line memories each having a capacity of storing 1-line image data, a line memory control circuit, etc., for example. When storing 10-line image data, the input image storage section 10 outputs the 11-line input image data containing the next input image data input in sequence from the outside to the image data retention section 11 in sequence. The output order should be designed appropriately in response to the function of the image data retention section 11 following the input image storage section 10. The embodiment adopts such an output order in which the 11 pixel density values corresponding to the leftmost pixels of the lines are output, then the 11 pixel density values corresponding to the second pixels from the left of the lines are output. In accordance with thus process, the input image storage section 10 repeats the process until it sequentially outputs the 11-line input image data in conjunction with the input image data input representing the last line of the input image, thereby vertically scanning the input image.

Figures 11, 12:
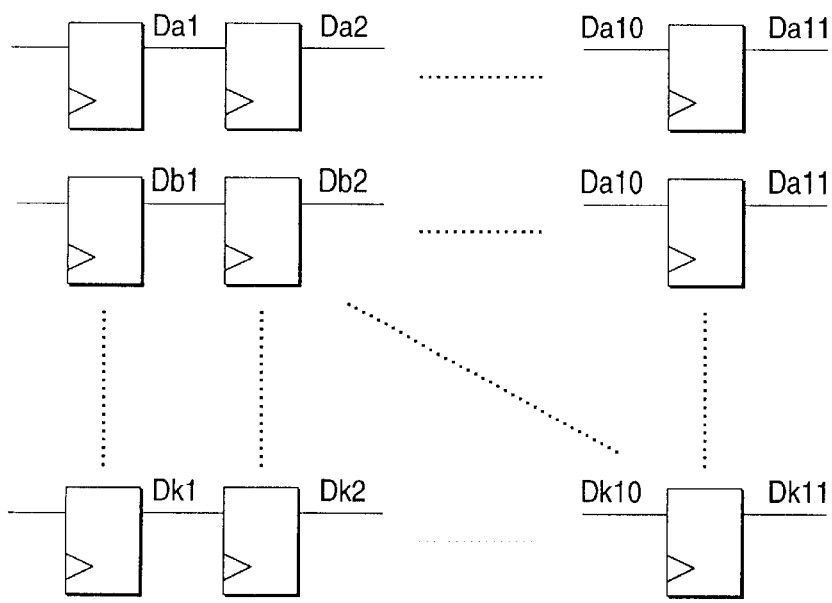
FIG. 11 is an illustration to show a circuit configuration example of an image data retention section of the image processing apparatus in the embodiment of the invention.
FIG. 12 is an illustration to show a window area set by the image data retention section in FIG. 11.

The image data retention section 11 includes a flip-flop group 18 constructed by 11×11 flip-flops as shown in FIG. 11 to retain the most recent 11-row image data of the 11-line input image data input in sequence from the input image storage section 10. That is, the image data retention section 11 forms a 11×11-cell window area 19 of the flip-flop group 18 as shown in FIG. 12 and temporarily retains the most recent 11-row image data existing in the window area 19, of the input image data input in sequence, thereby horizontally scanning the input image with the window area 19. Each time the line corresponding to the input image data output in sequence from the input image storage section 10 changes, namely, vertical scanning is executed, the image data retention section 11 clears the retained 11-row image data.

Figure 14:
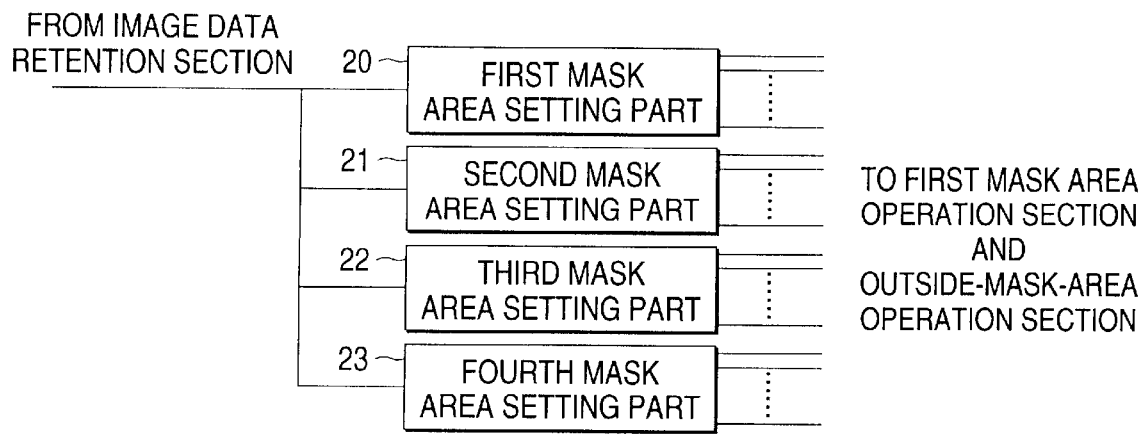
FIG. 14 is a block diagram to show a configuration example of a mask area setting section of the image processing apparatus in the embodiment of the invention.

The mask area setting section 12 extracts mask area data and outside-mask-area data from the image data retained in the flip-flop group 18 of the image data retention section 11 and is made up of four mask area setting parts (first mask area setting part 20, second mask area setting part 21, third mask area setting part 22, and fourth mask area setting part 23), for example, as shown in FIG. 14 to recognize four specific images in total. The first to fourth mask area setting parts 20–23 correspond to the images to be recognized 1, 3, 4, and 5 respectively.

Here, assume that mask areas corresponding to the specific images are set on the window area 19 as in FIGS. 7A–7D to recognize the image to be recognized 1 in FIG. 2 and the images to be recognized 3–5 in FIG. 4, namely, that six mask areas are set for each specific image, as shown in FIGS. 13A–13D, on the window area 19.

In this case, each mask area setting part extracts data in the window area 19 for every six mask areas set corresponding to the specific image area corresponding to the mask area setting part from the image data in the window area 19 and outputs the extracted data to the first mask area operation section 13. Also, each mask area setting part outputs the image data existing in the window area outside the six mask areas set corresponding to the mask area setting part from the image data in the window area 19 to the outside-mask-area operation section 14 as outside-mask-area data.

However, the mask area setting section 12 does not perform the processing while 11-row image data is not retained in the image data retention section 11.

Figure 13A:
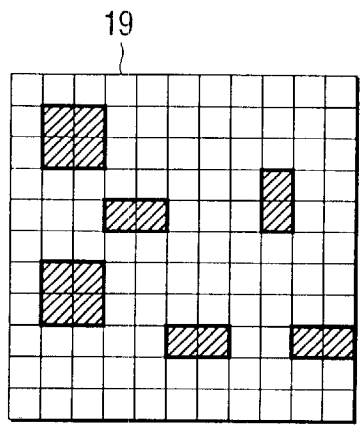
FIGS. 13A–13D are illustrations to show examples of mask areas set in the image processing apparatus in the embodiment of the invention.
Figure 13B:
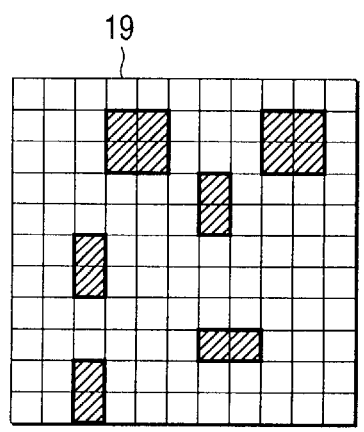
Figure 13C:
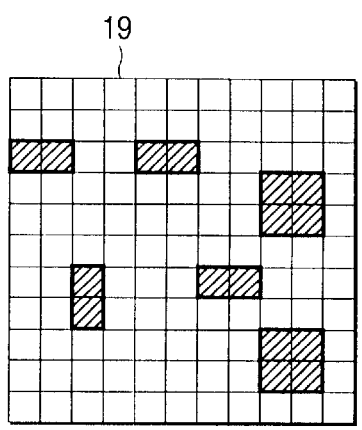
Figure 13D:
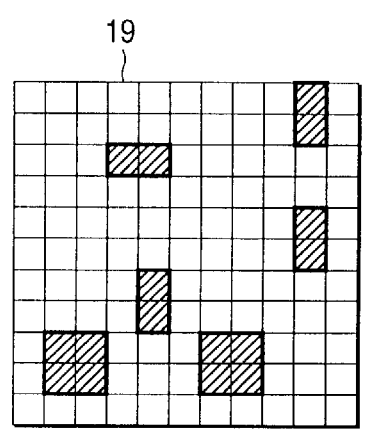

For example, as seen FIG. 12 and in FIG. 13A, the first mask area setting part 20 extracts the image data on Db2, Db3, Dc2, and Dc3 in the window area 19 as one mask area data, the image data on Dd9 and De9 as one mask area data, the image data on De4 and De5 as one mask area data, the image data on Dg2, Dg3, Dh2, and Dh3 as one mask area data, the image data on Di6 and Di7 as one mask area data, and the image data on Di10 and Di11 as one mask area data, and outputs the mask area data to the first mask area operation section 13. Also, it extracts the image data in the window area 19 other than the mask area data as outside-mask-area data and outputs the data to the outside-mask-area operation section 14.

The data extraction operation is performed each time the image data retained in the flip-flop group 18 is shifted.

Figure 15:
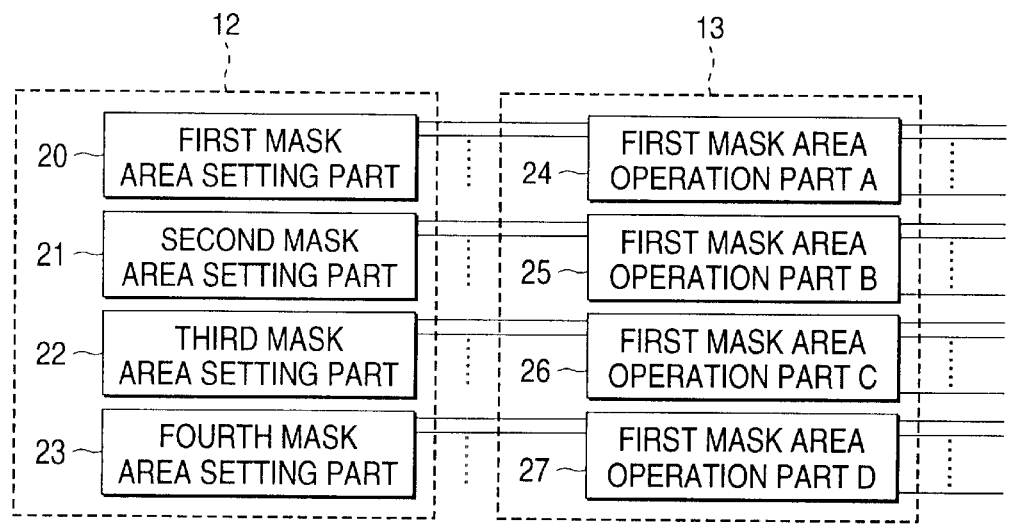
FIG. 15 is a block diagram to show the correspondence between the configuration of the mask area setting section and the configuration of a first mask area operation section of the image processing apparatus in the embodiment of the invention.

The first mask area operation section 13 performs a logical operation or an arithmetic operation on the plurality of mask area data output from the mask area setting section 12 and is made up of four first mask area operation parts (first mask area operation part A 24, first mask area operation part B 25, first mask area operation part C 26, and first mask area operation part D 27), for example, as shown in FIG. 15. The first mask area operation parts A to D are provided corresponding to the images to be recognized 1, 3, 4, and 5 respectively and input the mask area data output from the first mask area setting part 20, the second mask area setting part 21, the third mask area setting part 22, and the fourth mask area setting part 23 of the mask area setting section 12. Here, the mask area data pieces output from the mask area setting parts 20 to 23 (namely, the mask area data pieces corresponding to the specific images 1 and 3 to 5) are mask area data A, B, C, and D and the names responsive to the handled data are given to the first mask area operation parts A to D.

Figure 16:
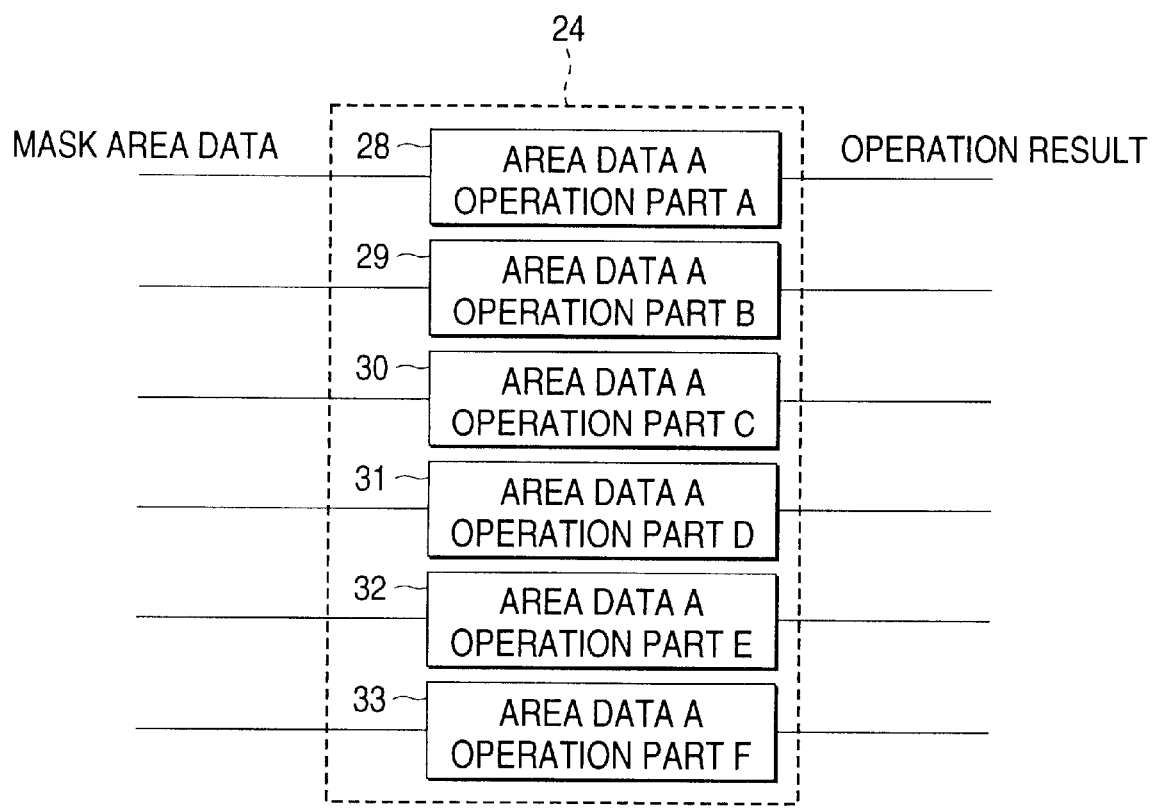
FIG. 16 is a block diagram to show a configuration example of the first mask area operation section of the image processing apparatus in the embodiment of the invention.

Each of the four first mask area operation parts is made up of six area data operation parts corresponding to the six mask areas set for each specific image. For example, the first mask area operation part A 24 consists of an area data A operation part A 28, an area data A operation part B 29, . . . , an area data A operation part F 33, as shown in FIG. 16, for performing operation on each mask area data.

Basically, the operation performed in each area data operation part may be AND or OR logical operation on the data or addition of the data. All area data operation parts need not perform the same type of operation and further a number of operations may be performed on one mask area data and a number of results may be output. That is, what operations are to be performed should be specified based on the characteristics of an input image and the images to be recognized, the mask area setting method, the required recognition accuracy, etc.

Figure 17:
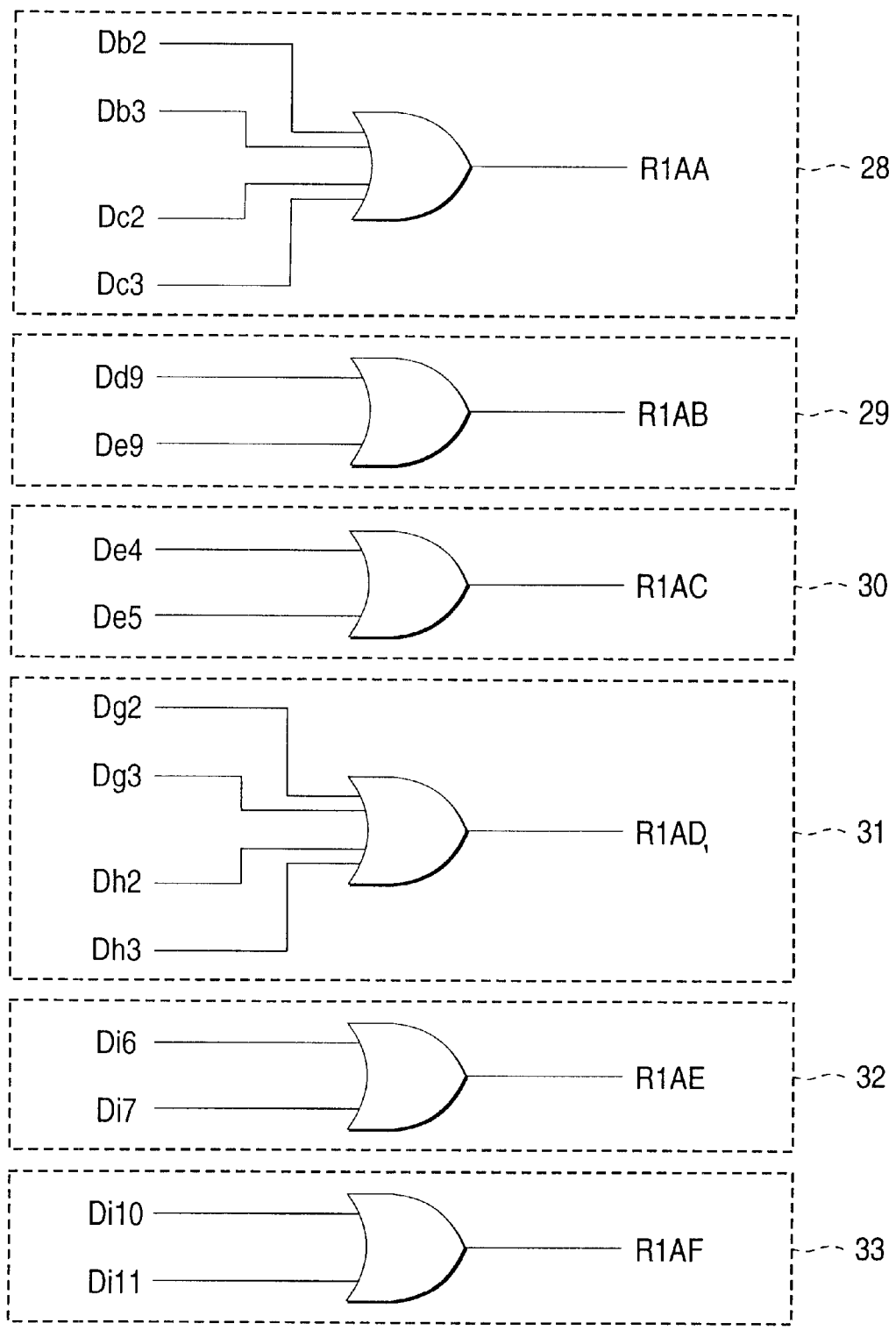
FIG. 17 is a block diagram to show a circuit configuration example of the first mask area operation section of the image processing apparatus in the embodiment of the invention.

In the embodiment, the operation performed in each area data operation part is to OR all data values contained in the mask area data from the mask area setting section 12. That is, as shown in FIG. 17, each area data operation part performs an operation with an OR circuit of multiple inputs an done output. Resultantly, for example, the area data A operation part A 28 performs logical operation OR of all data (namely, Db2, Db3, Dc2, and Dc3 in FIG. 12) values contained in input area data A and outputs the result as a 1-bit signal R1AA. The area data A operation part B 29, the area data A operation part C 30, the area data A operation part D 31, the area data A operation part E 32, and the area data A operation part F 33 perform similar processing to that of the area data A operation part A 28 in parallel and output 1-bit signals R1AB, R1AC, R1AD, R1AE, and R1AF.

The first mask area operation parts perform the above-described operation processing in parallel and each part outputs six operation result representing signals. That is, 24 signals in total are output.

Figure 18:
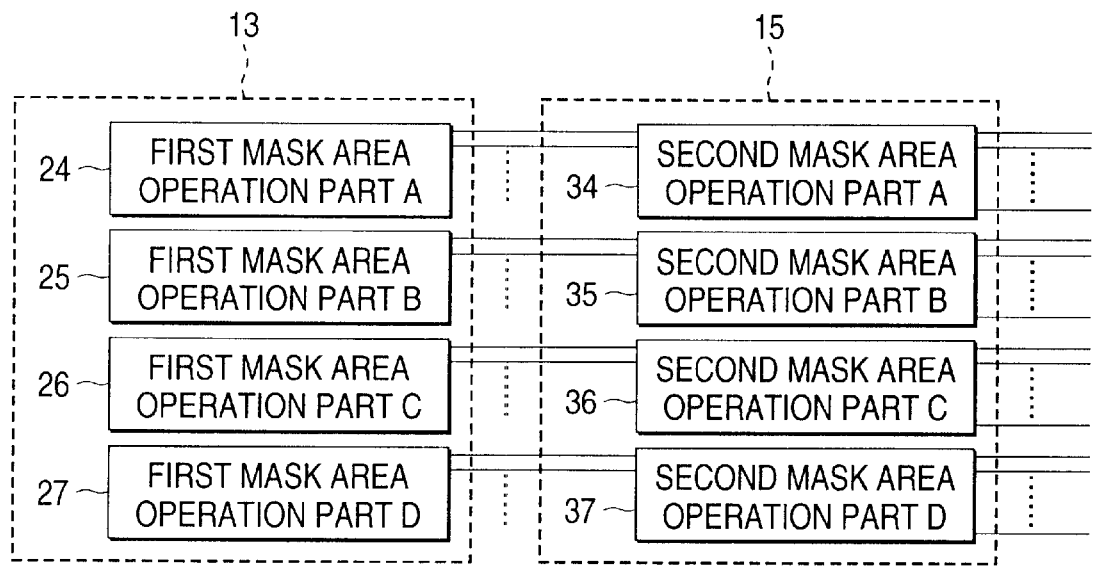
FIG. 18 is a block diagram to show the correspondence between the configuration of the first mask are a operation section and the configuration of a second mask area operation section of the image processing apparatus in the embodiment of the invention.

The second mask area operation section 15 performs a logical operation or an arithmetic operation on the mask area data operation results from the first mask area operation section 13 for each specific image. In the embodiment, as shown in FIG. 18, the second mask area operation section 15 is made up of a second mask area operation part A 34, a second mask area operation part B 35, a second mask area operation part C 36, and a second mask area operation part D 37. As seen in FIG. 18, the second mask area operation part A 34, the second mask area operation part B 35, the second mask area operation part C 36, and the second mask area operation part D 37 are provided corresponding to the images to be recognized 1, 3, 4, and 5 respectively and input six outputs from the first mask area operation part A 24, six outputs from the first mask area operation part B 25, six output from the first mask area operation part C 26, and six outputs from the first mask area operation part D 27.

Figure 19:
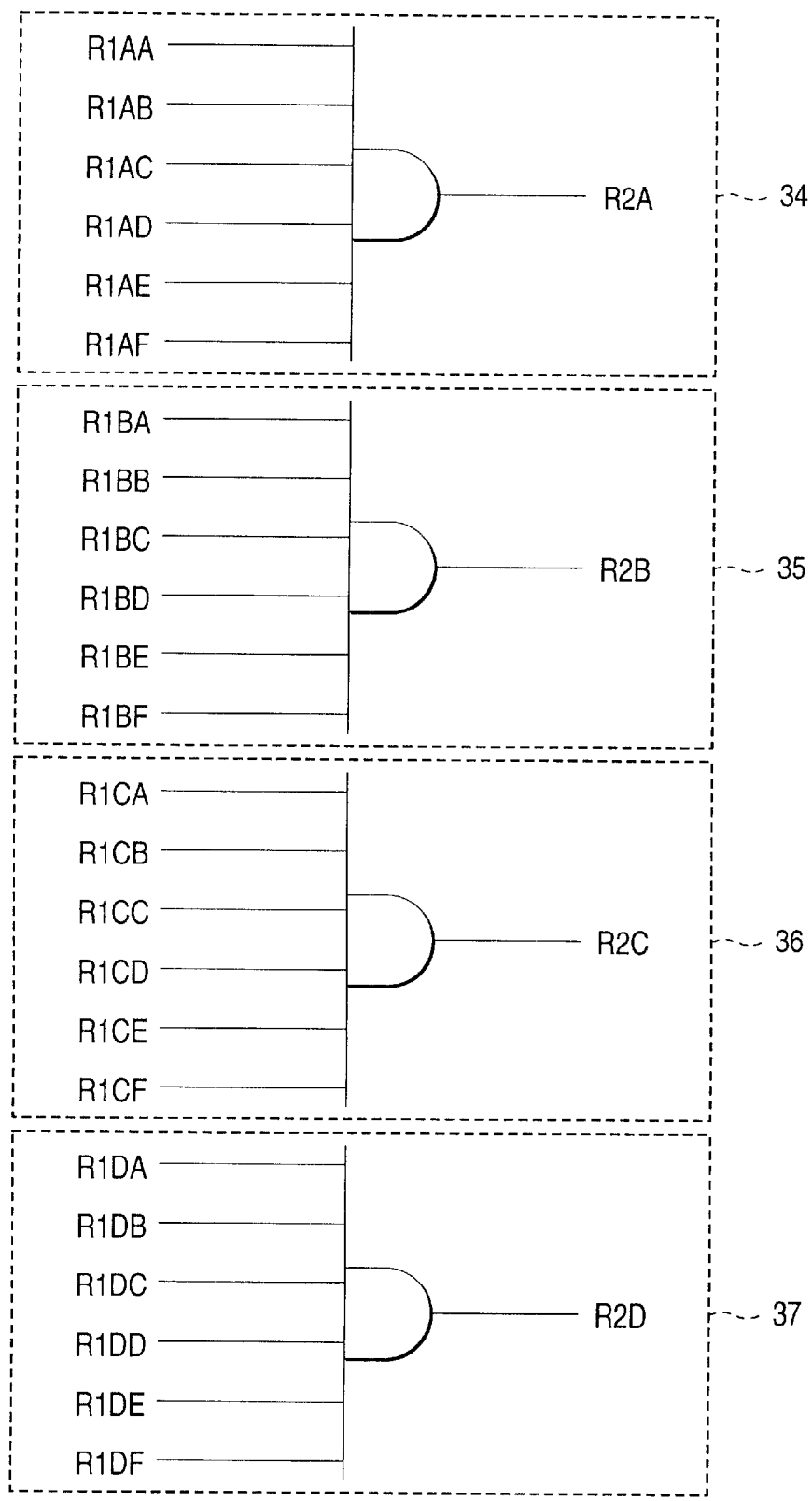
FIG. 19 is a diagram to show a circuit configuration example of the second mask area operation section of the image processing apparatus in the embodiment of the invention.

In the embodiment, each of the second mask area operation part A 34, the second mask area operation part B 35, the second mask area operation part C 36, and the second mask area operation part D 37 ANDs six input data pieces and outputs the result as a 1-bit signal R2A, R2B, R2C, R2D, as shown in FIG. 19. That is, the second mask area operation section 15 outputs a signal indicating whether or not black pixels exist on the input image corresponding to all the six mask areas for each specific image.

Figure 20:
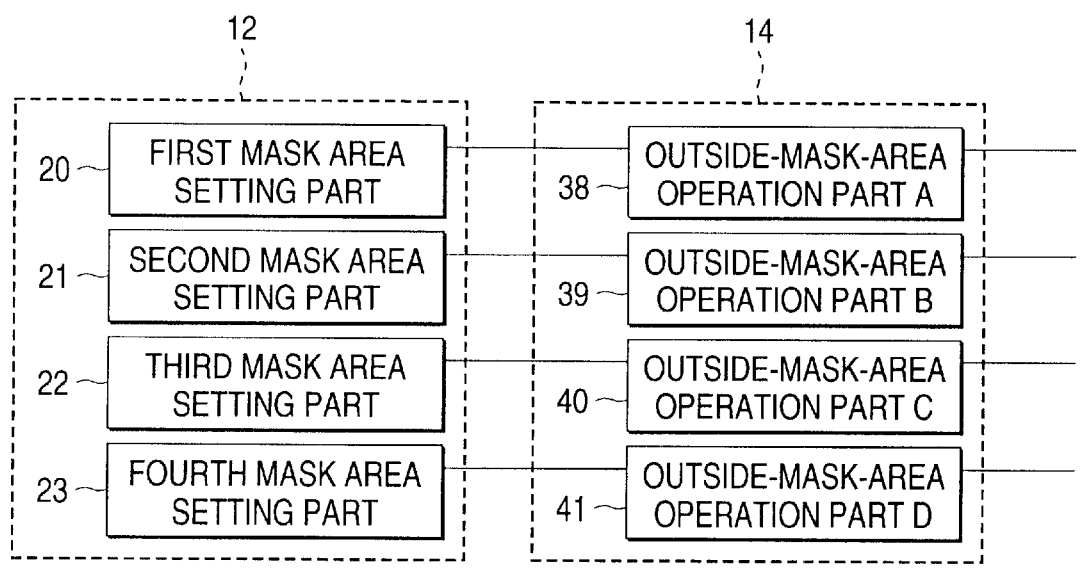
FIG. 20 is a block diagram to show the correspondence between the configuration of the mask area setting section and the configuration of an outside-mask-area operation section of the image processing apparatus in the embodiment of the invention.

The outside-mask-area operation section 14 performs a logical operation or an arithmetic operation on a number of outside-mask-area data pieces from the mask area setting section 12 and is made up of an outside-mask-area operation part A 38, an outside-mask-area operation part B 39, an outside-mask-area operation part C 40, and an outside-mask-area operation part D 41, as shown in FIG. 20. As seen in FIG. 20, the outside-mask-area operation part A 38, the outside-mask-area operation part B 39, the outside-mask-area operation part C 40, and the outside-mask-area operation part D 41, which are provided corresponding to the images to be recognized 1, 3, 4, and 5 respectively, input the outside-mask-area data from the first mask area setting part 20, the second mask area setting part 21, the third mask area setting part 22, and the fourth mask area setting part 23 and perform predetermined operation on the input data.

Figure 21:
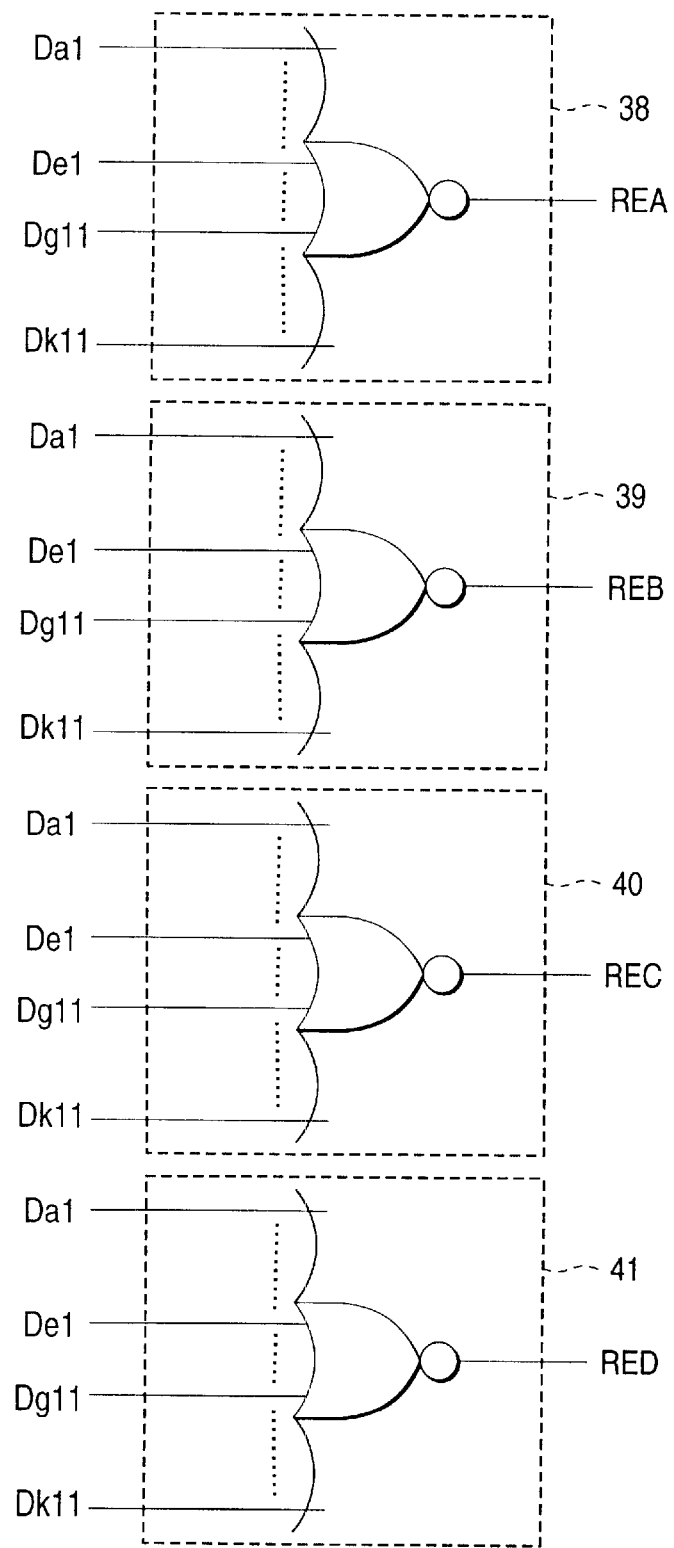
FIG. 21 is a block diagram to show a circuit configuration example of the outside-mask-area operation section of the image processing apparatus in the embodiment of the invention.

In the embodiment, the outside-mask-area operation part A 38, the outside-mask-area operation part B 39, the outside-mask-area operation part C 40, and the outside-mask-area operation part D 41 are formed so as to realize circuits as shown in FIG. 21. That is, each of the outside-mask-area operation part A 38, the outside-mask-area operation part B 39, the outside-mask-area operation part C 40, and the outside-mask-area operation part D 41 NORs the input outside-mask-area data pieces and outputs the result as a 1-bit signal REA, REB, REC, RED.

As described above, the operation performed in each second mask area operation part and the operation performed in each outside-mask-area operation part basically may perform AND or OR logical operation on the input data or arithmetic operation of adding the input data. Basically, the second mask area operation parts need not perform the same type of operation and further the outside-mask-area operation parts need not perform the same type of operation either. That is, the operation contents of the second mask area operation parts and the outside-mask-area operation parts should be set based on the image characteristics, the mask area setting method, the recognition accuracy, etc.

Figure 22:
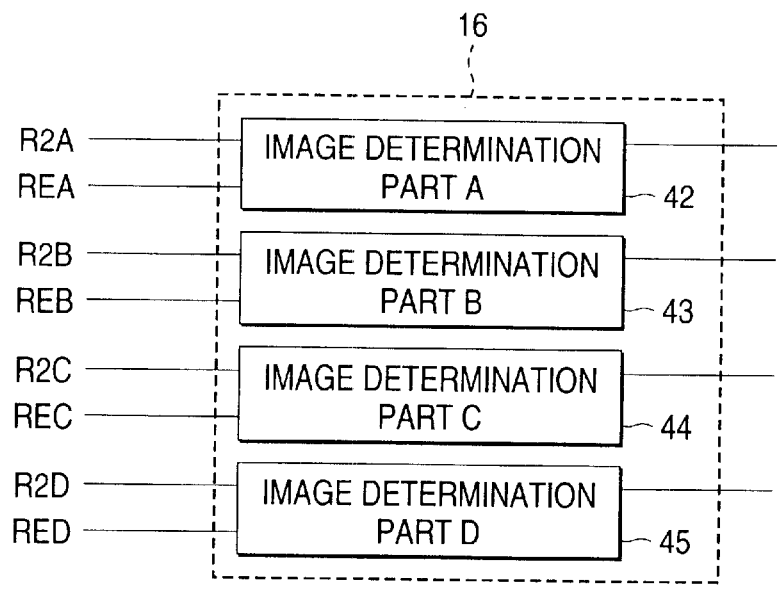
FIG. 22 is a block diagram to show a configuration example of an image determination section of the image processing apparatus in the embodiment of the invention.

The image determination section 16 determines whether or not each specific image exists based on the outputs (operation results) of the second mask area operation section 15 and the outside-mask-area operation section 14 and is made up of an image determination part A 42, an image determination part. B 43, an image determination part C 44, and an image determination part D 45, as shown in FIG. 22. The image determination part A 42, the image determination part B 43, the image determination part C 44, and the image determination part D 45 are provided corresponding to the images to be recognized 1, 3, 4, and 5 and input the output signal R2A of the second mask area operation section 15 and the output signal REA of the outside-mask-area operation section 14, the output signal R2B of the second mask area operation section 15 and the output signal REB of the outside-mask-area operation section 14, the output signal R2C of the second mask area operation section 15 and the output signal REC of the outside-mask-area operation section 14, and the output signal R2D of the second mask area operation section 15 and the output signal RED of the outside-mask-area operation section 14.

Figure 23:
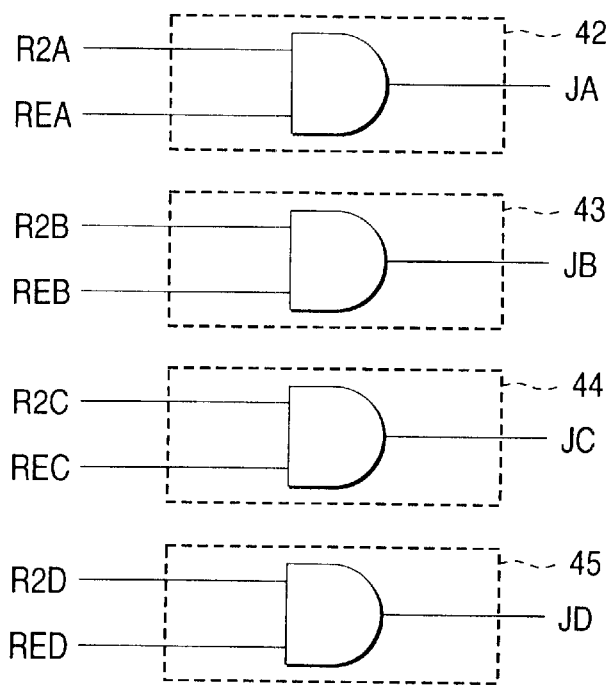
FIG. 23 is a diagram to show a circuit configuration example of the image determination section of the image processing apparatus in the embodiment of the invention.

Each of the image determination part A 42, the image determination part B 43, the image determination part C 44, and the image determination part D 45 determines that "specific image exists" if the input signals satisfy a predetermined condition. In the embodiment, as shown in FIG. 23, each of the image determination part A 42, the image determination part B 43, the image de termination part C 44, and the image determination part D 45 ANDs two input signals and outputs the result as determination result JA, JB, JC, JD. That is, if the output signals of the second mask area operation section 15 and the outside-mask-area operation section 14 are both high for each specific area, a high signal indicating that the "specific image exists" is output as the determination result. The image determination part A 42, the image determination part B 43, the image determination part C 44, and the image determination part D 45 perform the determination processing in parallel in the same cycle.

Each image determination part may find "probability of specific image" based on the values (levels) of two input signals. For example, all or some of the operations in the first mask area operation section 13, the outside-mask-area operation section 14, and the second mask area operation section 15 may be operations with the result that can be ternary or more (for example, arithmetic operation) and the operation results are compared with a preset threshold value to find the probability.

Figure 24:
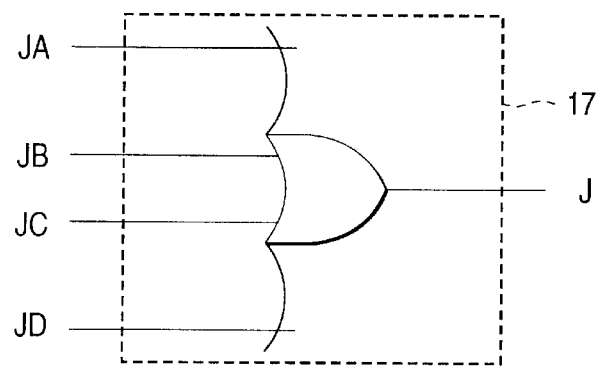
FIG. 24 is a diagram to show a circuit configuration example of a specific image recognition section of the image processing apparatus in the embodiment of the invention.
Figure 25:
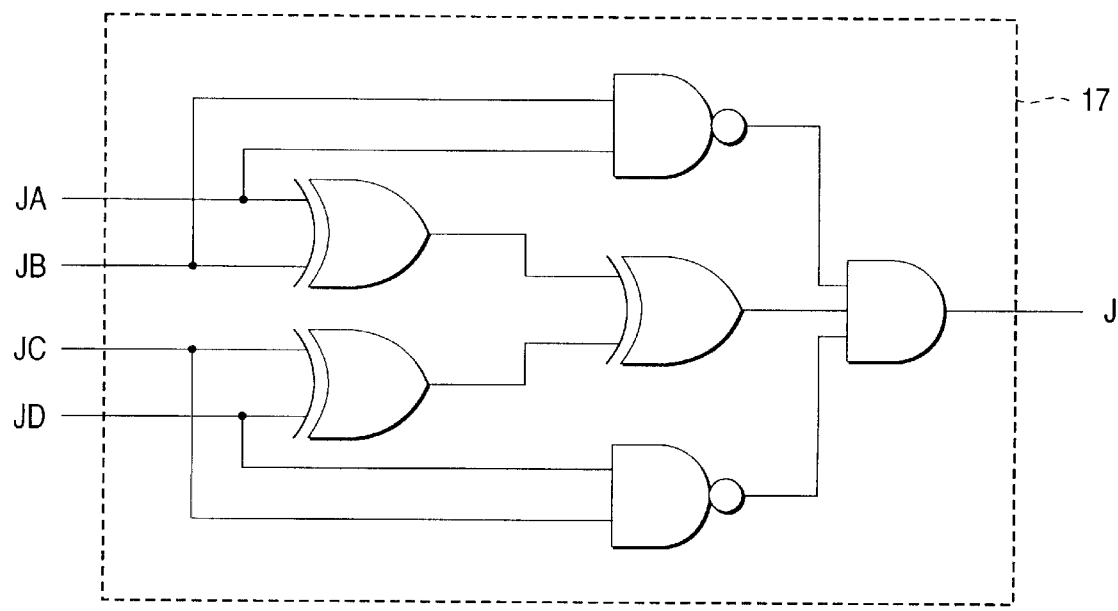
FIG. 25 is a diagram to show another circuit configuration example of the specific image recognition section of the image processing apparatus in the embodiment of the invention.

The specific image recognition section 17 finally determines whether or not specific image exists based on the output of the image determination section 16 (determination result JA, JB, JC, JD). It may OR the determination results JA, JB, JC, and JD and output the result as the determination result as shown in FIG. 24 or may output a high signal as the determination result only if only one of the determination results JA, JB, JC, and JD is high as shown in FIG. 25.

If each output of the image determination section 16 is "probability of specific image," the specific image recognition section 17 may assume that it recognizes a specific image corresponding to the output representing the highest probability solely, and determine that specific image exists. Further, a threshold value for the probability is provided and it may be determined that a specific image corresponding to the output representing the highest probability equal to or higher than the threshold value is recognized. In addition, if the specific image recognition section 17 determines that a specific image exists, it may output the recognition result data representing the determination result and a signal having information indicating which specific image exists.

(3) Specific processing example

Next, the processing contents of the described image processing apparatus will be discussed with a specific example. Here, assume that specific images are the images to be recognized 1, 3, 4, and 5 shown in FIGS. 5A–5D, that an input image is the input image 9 shown in FIG. 8, and that mask areas for the images to be recognized 1, 3, 4, and 5 are set as shown in FIGS. 13A–13D. Also, assume that the input image 9 is read through some read unit into the image processing apparatus or is input through a communication unit to the image processing apparatus. Further, assume that if the input image 9 is a color or gray-scale image, it is binarized in predetermined color and predetermined density, then input to the input image storage section 10 in sequence as binary digital data. Assume that the first mask area operation section 13 adopts the configuration as shown in FIG. 16 and FIG. 17, that the outside-mask-area operation section 14 adopts the configuration as shown in FIG. 20 and FIG. 21, that the second mask area operation section 15 adopts the configuration as shown in FIG. 18 and FIG. 19, and that the image determination section 16 adopts the configuration as shown in FIG. 22 and FIG. 23.

When the first 10-line input image data of the input image 9 is stored in the input image storage section 10 and the 11th-line input image data is input in sequence, the input image storage section 10 sequentially outputs the stored 10-line input image data plus the input image data input in sequence. That is, the input image storage section 10 sequentially outputs the 11-line input image data containing the input image data input in sequence to the image data retention section 11. The process is repeated until the 11-line input image data containing the last-line input image data is output to the image data retention section 11 in sequence. Resultantly, as shown in FIG. 9, the input image 9 is scanned in the window area 19 formed of the flip-flop group 18 of the image data retention section 11. The specific image recognition processing is repeated during the scanning. Here, a recognition processing example applied when an image in the window area 19 is not recognized as a specific image and a recognition processing example applied when an image in the window area 19 is recognized as a specific image are given and the description is simplified.

(3-1) When not recognized as specific image

First, the recognition processing in which an image in the window area 19 is not recognized as a specific image will be discussed.

When input image data representing the input image 9 is input to the image data retention section 11 in sequence, the image data in the window area 19 may become image data as shown in FIG. 26 where each white pixel is represented as '0' and each black pixel is represented as '1.'

Under such circumstances, if the mask area setting section 12 extracts image data inside and outside the mask areas from the image data in the window area 19 according to setting of the mask areas shown in FIGS. 13A–13D, the extracted data in the first to fourth mask area setting parts 20–23 becomes data as shown in FIGS. 27A–27D and is output to the first mask area operation section 13. The image data outside the mask areas is output from the mask area setting section 12 to the outside-mask-area operation section 14.

The first mask area operation part A 24 outputs [R1AA, R1AB, R1AC, R1AD, R1AE, R1AF]=[0, 0, 0, 0, 0, 0], the first mask area operation part B 25 outputs [R1BA, R1BB, R1BC, R1BD, R1BE, R1BF]=[0, 0, 0, 1, 0, 1], the first mask area operation part C 26 outputs [R1CA, R1CB, R1CC, R1CD, R1CE, R1CF]=[0, 0, 0, 0, 0, 0], and the first mask area operation part D 27 outputs [R1DA, R1DB, R1DC, R1DD, R1DE, R1DF]=[1, 0, 0, 0, 0, 0] to the second mask area operation section 15, respectively. Further, the second mask area operation section 15 outputs all '0' and the image determination section 16 outputs all '0,' then the specific image recognition section 17 determines that the images to be recognized do not exist, and outputs recognition result data representing the determination.

(3-2) When recognized as specific image

Next, the recognition processing in which an image in the window area 19 is recognized as a specific image will be discussed.

When input image data representing the input image 9 is input to the image data retention section 11 in sequence, the image data in the window area 19 may become image data as shown in FIG. 28. FIG. 28 results from shifting the window area 19 shown in FIG. 26 right one dot and downward one dot in the figure; as scanning advances from the state in FIG. 26, the situation in FIG. 28 results.

Under such circumstances, the extracted data in the first to fourth mask area setting parts 20–23 becomes data as shown in FIG. 29A–29D and is output to the firstmask area operation section 13. The image data outside the mask areas is output from the mask area setting section 12 to the outside-mask-area operation section 14.

The first mask area operation part A 24 outputs [R1AA, R1AB, R1AC, R1AD, R1AE, R1AF]=[0, 1, 0, 0, 0, 0], the first mask area operation part B 25 outputs [R1BA, R1BB, R1BC, R1BD, R1BE, R1BF]=[1, 0, 0, 0, 0, 0], the first mask area operation part C 26 outputs [R1CA, R1CB, R1CC, R1CD, R1CE, R1CF]=[1, 0, 0, 0, 0, 0], and the first mask area operation part D 27 outputs [R1DA, R1DB, R1DC, R1DD, R1DE, R1DF]=[1, 1, 1, 1, 1, 1]. In the outside-mask-area operation section 14, only the output RED of the outside-mask-area operation part D 41 becomes '1.' In the image determination section 16, only the output JD becomes '1,' to thereby determine that the image to be recognized 5 exists.

When the specific image recognition section 17 adopts the configuration as shown in FIG. 24 or FIG. 25, output J becomes '1' and recognition result data indicating that specific image is recognized is output.

(3-3) Operation result

The above-described recognition processing is performed each time the image data in the input image 9 changes. Finally, the images to be recognized 5, 3, 4, and 1 are recognized in the order.

(4) Supplemental remarks

As described above, according to the image processing apparatus, a specific image and the images provided by rotating the specific image can be recognized in parallel.

If processing of each section of the image processing apparatus is performed in synchronization with reference clock CLK, the processing cycles become as shown in FIG. 30 and real-time processing can be realized. Of course, each operation speed does not involve any problem, a plurality of operation processes and determination processes may be performed in one clock cycle.

III. Modified embodiments (1) First modified embodiment

Figure 31:
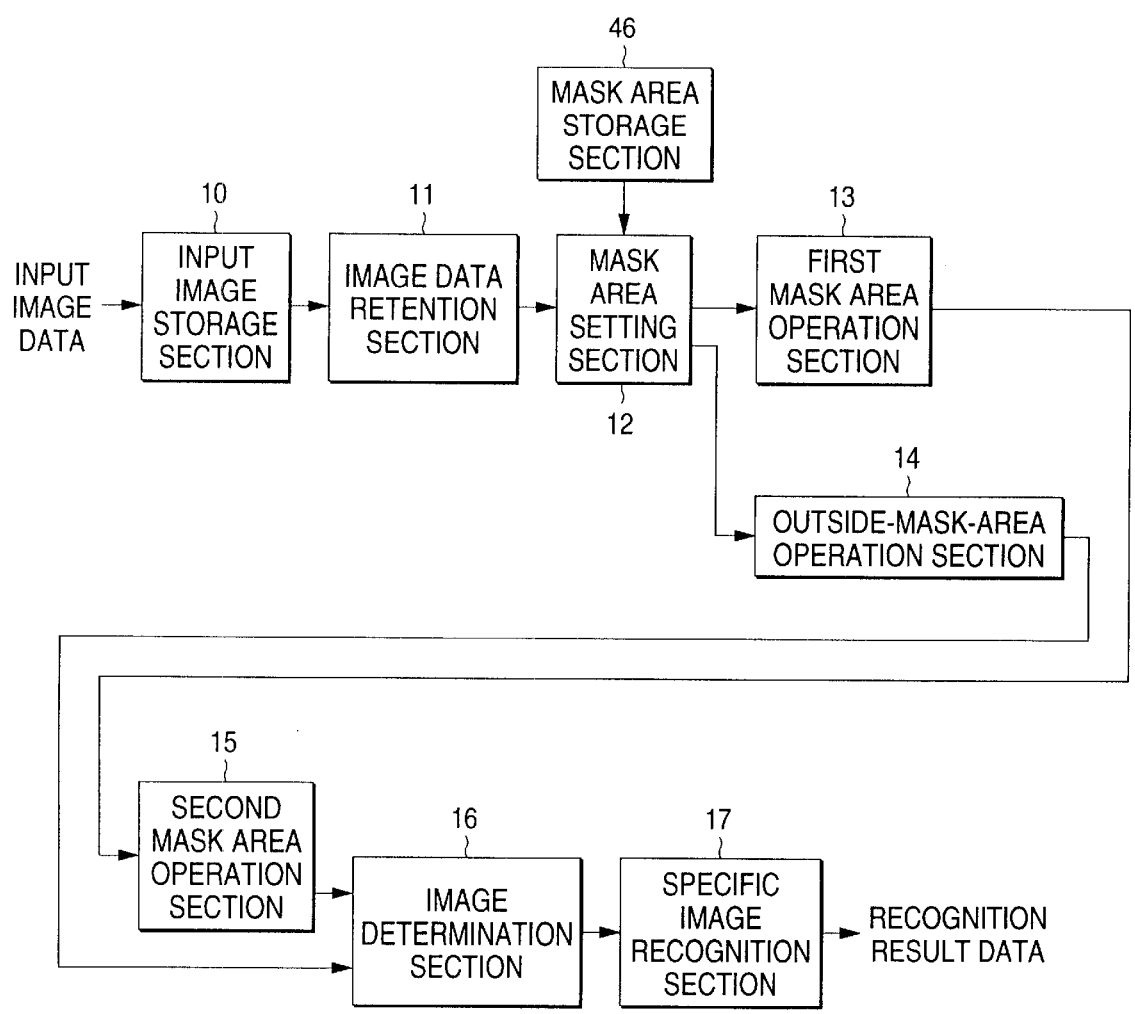
FIG. 31 is a block diagram to show the configuration of a modified embodiment of the image processing apparatus.

FIG. 31 shows the configuration of a first modified embodiment of the described image processing apparatus. The configuration shown in the figure differs from that shown in FIG. 10 only in that it comprises a mask area storage section 46. Parts identical with or similar to those previously described with reference to FIG. 10 are denoted by the same reference numerals in FIG. 31 and will not be discussed again.

In FIG. 31, the mask area storage section 46 stores mask area setup information (for example, mask area coordinates) and a mask area setting section 12 sets mask areas based on the setup information stored in the mask area storage section 46. Therefore, the mask area storage section 46 itself is configured exchangeably, whereby the mask areas can be changed easily; when a specific image to be recognized is changed to another image, the mask areas for the image can be set easily. In addition, the recognition accuracy can also be improved.

Of course, data update may be more facilitated by configuring the mask area storage section 46 so that the storage contents can be read and written from the outside. Mask area information of a specific image not rotated and information on rotation angles at which the specific image is rotated to provide the images to be recognized may be stored in the mask area storage section 46 and from the information, the mask area setting section 12 may calculate and set mask areas for all images to be recognized. In this case, the storage capacity required for the mask area storage section 46 can be reduced.

(2) Second modified embodiment

In a second modified embodiment of the image processing apparatus, if an input image is a color image, recognition processing is performed without performing binarization. The configuration shown in FIG. 10 can be used as the configuration of the second modified embodiment and therefore the reference numerals in FIG. 10 are used as they are for describing sections of the second modified embodiment. Here, assume that an input image is a color image with R, G. and B color signals each consisting of eight bits.

In this case, data representing one pixel becomes 8 bits ×3 colors=24 bits, thus an input image storage section 10 requires a line buffer capable of storing a plurality of lines of 8-bit pixel data for each of R, G, and B color signals. The data read from the input image storage section 10 is retained in a window area formed of a flip-flop group in an image data retention section 11. The window area is separated into planes for each of R, G, and B colors and eight flip-flops capable of storing 8-bit data are assigned to each pixel. That is, assuming that the window area has a size of m×n, m×n×8×3 flip-flops make up the flip-flop group.

A mask area setting section 12 extracts image data (pixel density values) for mask areas set for each image to be recognized from the image data retained in the image data retention section 11 and also extracts image data (pixel density values) outside the mask areas for each image to be recognized. A first mask area operation section 13 performs arithmetic operation (for example, addition) on the R, G, and B pixel density values of the image data for each mask area extracted by the mask area setting section 12 for each mask area, compares the operation result with a predetermined value, and outputs the operation result for each mask area based on the comparison result. A second mask area operation section 15 performs logical operation or arithmetic operation on the operation result for each mask area provided by the first mask area operation section 13 for each image to be recognized, and outputs the operation result for each image to be recognized.

On the other hand, in parallel with processing of the first mask area operation section 13 and the second mask area operation section 15, an outside-mask-area operation section 14 performs arithmetic operation (for example, addition) on the R, G, and B pixel density values of the outside-mask-area data extracted by the mask area setting section 12 for each specific image, compares the operation result with a predetermined value, and outputs the operation result for each image to be recognized based on the comparison result.

An image determination section 16 determines whether or not each image to be recognized exists based on the operation results of the second mask area operation section 15 and the outside-mask-area operation section 14, and outputs the determination result. Last, a specific image recognition section 17 determines whether or not any of the images to be recognized exists in the input image from the determination result of the image determination section 16 for each image to be recognized.

IV. Supplemental remarks

In the above-described embodiments and modified embodiments, simple operation processing is performed for simple specific images, but the invention can also be applied easily under more complicated conditions, needless to say. Particularly, the mask area setting method, the operation contents, the determination criteria, and the like are set considering the characteristics of input images, the image input means, etc., whereby the recognition accuracy can be improved, thus the invention can be applied to every image. It is obvious that the invention can be applied if the rotation angle of a specific image is arbitrary, but it can also be applied if different types of images are handled. Further, the pixel density values outside the mask areas are also considered for performing determination processing, but the invention is not limited to it; determination processing may be performed based only on the pixel density values inside the mask areas depending on the input image characteristics. From a recording medium recording a program describing the image processing method, the program is read and is executed by a computer system, whereby a system corresponding to the image processing apparatus can also be provided.

As described above, according to the invention, a plurality of images to be recognized including a specific image and images provided by rotating the specific image can be recognized in real time with high accuracy according to simple processing and configuration. Further, a number of images to be recognized are recognized independently, thus they are recognized concurrently, whereby the recognition processing can be performed at high speed.

The entire disclosure of each and every foreign patent application from which the benefit of foreign priority has been claimed in the present application is incorporated herein by reference, as if fully set forth.

While only certain embodiments of the invention have been specifically described herein, it will apparent that numerous modifications may be made thereto without departing from the spirit and scope of the invention.

What is claimed is:

1. An image recognition method of recognizing a plurality of images from an input image, the plurality of images to be recognized includes at least one of a specific image and images provided by rotating the specific image, the method comprising the steps of:

preparing at least one mask area on a window area for each image to be recognized, the window area being structured by cells which are two-dimensionally arrayed each cell being formed of at least one pixel, the mask area being structured by at least one of the cells and corresponding to an area representing a feature of the image to be recognized;

performing logical operations on pixel density values in each mask area to determine whether there exists an image to be recognized in the mask based on the result of the logical operations; and determining whether there exists any of the plurality of images to be recognized in the window area based on the determination of whether the image to be recognized exists in the mask area.

2. The image recognition method as claimed in claim 1, wherein the first determining step determines whether or not the image to be recognized exists based on the result of subjecting pixel density values of the input image in the mask area and the result of subjecting pixel density values of the input image in the window area outside the mask areas to operation for each image to be recognized.

3. The image recognition method as claimed in claim 1, wherein the first determining step determines whether or not there is a possibility that the image to be recognized exists based on the result of subjecting pixel density values in the mask areas on the input image to operation for each image to be recognized, and the second determining step determines whether or not there is a possibility that any of the images to be recognized exists in the window area based on the determination result for each image to be recognized.

4. The image recognition method as claimed in claim 1, further comprising the step of:

changing a relative position between the window area and the input image after the second determining step.

5. The image recognition method as claimed in claim 1, wherein the images to be recognized are provided by rotating the specific image at arbitrary angles with the same center position as a center.

6. The image recognition method as claimed in claim 5, wherein the mask areas are placed with the same center position matched with the center position of the window area.

7. The image recognition method as claimed in claim 6, wherein the window area is formed so that as each mask area is distant from the center position of the window area, the number of the cells making up the mask area increases.

8. The image recognition method as claimed in claim 1, wherein, in the preparing step, the mask areas for the images to be recognized are calculated and set based on the mask areas set for any one of the images to be recognized and the rotation angles of the images to be recognized.

9. An image recognition apparatus for recognizing a plurality of images from an input image, the plurality of images to be recognized includes at least one of a specific image and images provided by rotating the specific image, the apparatus comprising:

image data storage means for storing image data representing the input image;

mask area storage means for storing setup information so as to set at least one of the mask areas on a predetermined window area for each of the images to be recognized;

mask area operation means for performing logical operations on values of the image data in the mask areas for each image to be recognized;

image determination means for determining whether the image to be recognized exists based on the operation result of the mask area operation means for each image to be recognized; and specific image recognition means for determining whether any of the images to be recognized exist in the window area based on the determination result of the image determination means for each image to be recognized.

10. The image recognition apparatus as claimed in claim 9, further comprising:

mask area setting means for setting the desired mask areas on the window area for each of the images to be recognized.

11. The image recognition apparatus as claimed in claim 9, further comprising:

scan means for placing the image data in the window area in sequence.

12. The image recognition apparatus as claimed in claim 9, further comprising:

outside-mask-area operation means for operating values of the image data disposed in the window area outside the mask areas for each image to be recognized, wherein the image determination means determines whether or not the image to be recognized exists based on the operation result of the mask area operation means and the operation result of the outside-mask-area operation means for each image to be recognized.

13. The image recognition apparatus as claimed in claim 9, wherein the image determination means determines whether or not there is a possibility that the image to be recognized exists based on the operation result of the mask area operation means for each image to be recognized, and wherein the specific image recognition means determines whether or not there is a possibility that any of the images to be recognized exists in the window area based on the determination result of the image determination means for each image to be recognized.

14. The image recognition apparatus as claimed in claim 9, wherein storage contents of the mask area storage means can be read and write arbitrarily.

15. The image recognition apparatus as claimed in claim 9, wherein the setup information stored in the mask area storage means includes the setup information of the mask areas set for any one of the images to be recognized and rotation angles of the images to be recognized.

16. The image recognition apparatus as claimed in claim 9, wherein the images to be recognized are provided by rotating the specific image at arbitrary angles with the same center position as a center.

17. The image recognition apparatus as claimed in claim 16, wherein the mask areas are placed with the same center position matched with the center position of the window area.

18. The image recognition apparatus as claimed in claim 17, wherein the window area is formed so that as each mask area is distant from the center position of the window area, the number of the cells making up the mask area increases.

19. The image recognition apparatus as claimed in claim 17, wherein the mask area nearest to the center position of the window area is formed of only one cell.

20. The image recognition apparatus as claimed in claim 9, wherein the window area is a rectangular area.

21. The image recognition apparatus as claimed in claim 9, wherein the window area is a circular area.

22. The image recognition apparatus as claimed in claim 9, wherein the mask areas can be set arbitrarily.

23. The image recognition apparatus as claimed in claim 9, wherein the mask areas corresponding to the plurality of images to be recognized are set on a single window area.

24. The image recognition apparatus as claimed in claim 9, wherein the image data is a binary data.

25. The image recognition apparatus as claimed in claim 9, wherein processing for each image to be recognized is performed in parallel in the same cycle.

26. A recording medium recording a program for recognizing a plurality of images from an input image, the plurality of images to be recognized includes at least one of a specific image and images provided by rotating the specific image, the program comprising the steps of:

preparing at least one mask area on a window area for each image to be recognized, the window area being structured by cells which are two-dimensionally arrayed, each cell being formed of at least one pixel, the mask area being structured by at least one of the cells and corresponding to an area representing a feature of the image to be recognized;

performing logical operations on pixel density values in each mask area to determine whether there exists an image to be recognized in the mask based on the result of the logical operations; and determining whether there exists any of the plurality of images to be recognized in the window area based on the determination of whether the image to be recognized exists in the mask area.

* * * * *